United States Patent
Zhamu et al.

(10) Patent No.: US 9,905,373 B2
(45) Date of Patent: *Feb. 27, 2018

(54) SUPERCAPACITOR HAVING AN INTEGRAL 3D GRAPHENE-CARBON HYBRID FOAM-BASED ELECTRODE

(71) Applicant: Nanotek Instruments, Inc., Dayton, OH (US)

(72) Inventors: Aruna Zhamu, Springboro, OH (US); Bor Z Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 76 days.

This patent is subject to a terminal disclaimer.

(21) Appl. No.: 14/998,412

(22) Filed: Jan. 4, 2016

(65) Prior Publication Data

US 2017/0194105 A1     Jul. 6, 2017

(51) Int. Cl.
*H01G 11/32* (2013.01)
*H01G 11/24* (2013.01)
(Continued)

(52) U.S. Cl.
CPC ............. *H01G 11/32* (2013.01); *H01G 11/24* (2013.01); *H01G 11/36* (2013.01); *H01G 11/46* (2013.01);
(Continued)

(58) Field of Classification Search
CPC ........ H01G 11/30; H01G 11/04; H01G 11/86; H01G 11/24; H01G 11/26
See application file for complete search history.

(56) References Cited

U.S. PATENT DOCUMENTS

| 6,872,330 B2 | 3/2005 | Mack et al. |
|---|---|---|
| 7,071,258 B1 | 7/2006 | Jang et al. |

(Continued)

FOREIGN PATENT DOCUMENTS

| WO | WO2013/180662 | * | 5/2013 |
|---|---|---|---|
| WO | 2015054239 A1 | | 4/2015 |

OTHER PUBLICATIONS

B. Z. Jang and A Zhamu, "Processing of Nano Graphene Platelets (NGPs) and NGP Nanocomposites: A Review," J. Materials Sci. 43 (2008) 5092-5101.

(Continued)

*Primary Examiner* — Nguyen Ha

(57) ABSTRACT

Provided is a supercapacitor having an anode, a cathode, a porous separator/electrolyte, wherein at least one of electrodes contains an integral 3D graphene-carbon hybrid foam composed of multiple pores and pore walls, wherein the pore walls contain single-layer or few-layer graphene sheets chemically bonded by a carbon material having a carbon material-to-graphene weight ratio from 1/100 to 1/2, wherein the few-layer graphene sheets have 2-10 layers of stacked graphene planes having an inter-plane spacing $d_{002}$ from 0.3354 nm to 0.40 nm and the graphene sheets contain a pristine graphene material having essentially zero % of non-carbon elements, or a non-pristine graphene material having 0.01% to 25% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

27 Claims, 14 Drawing Sheets

(51) Int. Cl.
  *H01G 11/46* (2013.01)
  *H01G 11/86* (2013.01)
  *H01G 11/36* (2013.01)
  *H01G 11/70* (2013.01)
  *H01G 11/06* (2013.01)
  *H01G 11/02* (2013.01)

(52) U.S. Cl.
  CPC ............ *H01G 11/70* (2013.01); *H01G 11/86* (2013.01); *H01G 11/02* (2013.01); *H01G 11/06* (2013.01); *Y02E 60/13* (2013.01)

(56) References Cited

U.S. PATENT DOCUMENTS

| | | | |
|---|---|---|---|
| 7,327,000 | B2 | 2/2008 | DeHeer et al. |
| 7,824,651 | B2 | 11/2010 | Zhamu et al. |
| 2008/0149900 | A1 | 6/2008 | Jang et al. |
| 2009/0061312 | A1 | 3/2009 | Zhamu et al. |
| 2014/0190676 | A1 | 7/2014 | Zhamu et al. |
| 2014/0342249 | A1 | 11/2014 | He et al. |
| 2015/0239741 | A1 | 8/2015 | Burton et al. |
| 2017/0062143 | A1* | 3/2017 | Zhamu .................. H01G 11/86 |
| 2017/0182474 | A1* | 6/2017 | Zhamu .................. B01J 20/20 |
| 2017/0200565 | A1* | 7/2017 | Zhamu .................. H01G 11/32 |

OTHER PUBLICATIONS

William S. Hummers, Jr., et al., Preparation of Graphitic Oxide, Journal of the American Chemical Society, 1958, p. 1339.

Yang, et al. "Two-dimensional Graphene Nano-ribbons," J. Am. Chem. Soc. 130 (2008) 4216-17.

PCT/US17/12019 International Search Report and Written Opinion dated Apr. 28, 2017, 10 pages.

Hummers et al., "Preparation of Graphitic Oxide" Journal of the American Chemical Society (1958) p. 1339.

Jang et al., "Processing of Nano Graphene Platelets (NGPs) and NGP Nanocomposites: A Review" J. Materials Sci. (2008) vol. 43, pp. 5092-5101.

Yang et al., "Two-Dimensional Graphene Nano-Ribbons" J. Am. Chem. Soc. (2008) vol. 130, pp. 4216-4217.

* cited by examiner

SUPERCAPACITOR HAVING AN INTEGRAL 3D GRAPHENE-CARBON HYBRID FOAM-BASED ELECTRODE

FIELD OF THE INVENTION

The present invention relates generally to the field of supercapacitor or ultracapacitor and, more particularly, to a supercapacitor having an integral 3D graphene-carbon hybrid foam-based electrode and a process for producing this electrode and supercapacitor.

BACKGROUND OF THE INVENTION

A Critical Review on Supercapacitors

Electrochemical capacitors (ECs), also known as ultracapacitors or supercapacitors, are being considered for uses in hybrid electric vehicles (EVs) where they can supplement a battery used in an electric car to provide bursts of power needed for rapid acceleration, the biggest technical hurdle to making battery-powered cars commercially viable. A battery would still be used for cruising, but supercapacitors (with their ability to release energy much more quickly than batteries) would kick in whenever the car needs to accelerate for merging, passing, emergency maneuvers, and hill climbing. The EC must also store sufficient energy to provide an acceptable driving range. To be cost-, volume-, and weight-effective compared to additional battery capacity they must combine adequate energy densities (volumetric and gravimetric) and power densities with long cycle life, and meet cost targets as well.

ECs are also gaining acceptance in the electronics industry as system designers become familiar with their attributes and benefits. ECs were originally developed to provide large bursts of driving energy for orbital lasers. In complementary metal oxide semiconductor (CMOS) memory backup applications, for instance, a one-Farad EC having a volume of only one-half cubic inch can replace nickel-cadmium or lithium batteries and provide backup power for months. For a given applied voltage, the stored energy in an EC associated with a given charge is half that storable in a corresponding battery system for passage of the same charge. Nevertheless, ECs are extremely attractive power sources. Compared with batteries, they require no maintenance, offer much higher cycle-life, require a very simple charging circuit, experience no "memory effect," and are generally much safer. Physical rather than chemical energy storage is the key reason for their safe operation and extraordinarily high cycle-life. Perhaps most importantly, capacitors offer higher power density than batteries.

The high volumetric capacitance density of an EC relative to conventional capacitors (10 to 100 times greater than conventional capacitors) derives from using porous electrodes to create a large effective "plate area" and from storing energy in the diffuse double layer. This double layer, created naturally at a solid-electrolyte interface when voltage is imposed, has a thickness of only about 1 nm, thus forming an extremely small effective "plate separation." Such a supercapacitor is commonly referred to as an electric double layer capacitor (EDLC). The double layer capacitor is based on a high surface area electrode material, such as activated carbon, immersed in a liquid electrolyte. A polarized double layer is formed at electrode-electrolyte interfaces providing high capacitance. This implies that the specific capacitance of a supercapacitor is directly proportional to the specific surface area of the electrode material. This surface area must be accessible by electrolyte and the resulting interfacial zones must be sufficiently large to accommodate the so-called electric double-layer charges.

In some ECs, stored energy is further augmented by pseudo-capacitance effects, occurring again at the solid-electrolyte interface due to electrochemical phenomena such as the redox charge transfer.

However, there are several serious technical issues associated with current state-of-the-art ECs or supercapacitors:

(1) Experience with ECs based on activated carbon electrodes shows that the experimentally measured capacitance is always much lower than the geometrical capacitance calculated from the measured surface area and the width of the dipole layer. For very high surface area carbons, typically only about 10-20 percent of the "theoretical" capacitance was observed. This disappointing performance is related to the presence of micro-pores (<2 nm, mostly <1 nm) and ascribed to inaccessibility of some pores by the electrolyte, wetting deficiencies, and/or the inability of a double layer to form successfully in pores in which the oppositely charged surfaces are less than about 1-2 nm apart. In activated carbons, depending on the source of the carbon and the heat treatment temperature, a surprising amount of surfaces can be in the form of such micro-pores.

(2) Despite the high gravimetric capacitances at the electrode level (based on active material weights alone) as frequently claimed in open literature and patent documents, these electrodes unfortunately fail to provide energy storage devices with high capacities at the supercapacitor cell or pack level (based on the total cell weight or pack weight). This is due to the notion that, in these reports, the actual mass loadings of the electrodes and the apparent densities for the active materials are too low. In most cases, the active material mass loadings of the electrodes (areal density) is significantly lower than 10 mg/cm$^2$ (areal density=the amount of active materials per electrode cross-sectional area along the electrode thickness direction) and the apparent volume density or tap density of the active material is typically less than 0.75 g/cm$^{-3}$ (more typically less than 0.5 g/cm$^{-3}$ and most typically less than 0.3 g/cm$^{-3}$) even for relatively large particles of activated carbon.

The low mass loading is primarily due to the inability to obtain thicker electrodes (thicker than 100-200 μm) using the conventional slurry coating procedure. This is not a trivial task as one might think, and in reality the electrode thickness is not a design parameter that can be arbitrarily and freely varied for the purpose of optimizing the cell performance. Contrarily, thicker samples tend to become extremely brittle or of poor structural integrity and would also require the use of large amounts of binder resin. These problems are particularly acute for graphene material-based electrodes. It has not been previously possible to produce graphene-based electrodes that are thicker than 150 μm and remain highly porous with pores remaining fully accessible to liquid electrolyte. The low areal densities and low volume densities (related to thin electrodes and poor packing density) result in relatively low volumetric capacitances and low volumetric energy density of the supercapacitor cells.

With the growing demand for more compact and portable energy storage systems, there is keen interest to increase the utilization of the volume of the energy storage devices. Novel electrode materials and designs that enable high volumetric capacitances and high mass loadings are essential to achieving improved cell volumetric capacitances and energy densities.

(3) During the past decade, much work has been conducted to develop electrode materials with increased volumetric capacitances utilizing porous carbon-based materials, such as graphene, carbon nanotube-based composites, porous graphite oxide, and porous meso carbon. Although these experimental supercapacitors featuring such electrode materials can be charged and discharged at high rates and also exhibit large volumetric electrode capacitances (100 to 200 F/cm$^3$ in most cases, based on the electrode volume), their typical active mass loading of <1 mg/cm$^2$, tap density of <0.2 g/cm$^{-3}$, and electrode thicknesses of up to tens of micrometers (<<100 μm) are still significantly lower than those used in most commercially available electrochemical capacitors (i.e. 10 mg/cm$^2$, 100-200 μm), which results in energy storage devices with relatively low areal and volumetric capacitances and low volumetric energy densities.

(4) For graphene-based supercapacitors, there are additional problems that remain to be solved, explained below:

Nano graphene materials have recently been found to exhibit exceptionally high thermal conductivity, high electrical conductivity, and high strength. Another outstanding characteristic of graphene is its exceptionally high specific surface area. A single graphene sheet provides a specific external surface area of approximately 2,675 m$^2$/g (that is accessible by liquid electrolyte), as opposed to the exterior surface area of approximately 1,300 m$^2$/g provided by a corresponding single-wall CNT (interior surface not accessible by electrolyte). The electrical conductivity of graphene is slightly higher than that of CNTs.

The instant applicants (A. Zhamu and B. Z. Jang) and their colleagues were the first to investigate graphene- and other nano graphite-based nano materials for supercapacitor application [Please see Refs. 1-5 below; the 1$^{st}$ patent application was submitted in 2006 and issued in 2009]. After 2008, researchers began to realize the significance of nano graphene materials for supercapacitor applications.

LIST OF REFERENCES

1. Lulu Song, A. Zhamu, Jiusheng Guo, and B. Z. Jang "Nano-scaled Graphene Plate Nanocomposites for Supercapacitor Electrodes" U.S. Pat. No. 7,623,340 (Nov. 24, 2009).
2. Aruna Zhamu and Bor Z. Jang, "Process for Producing Nano-scaled Graphene Platelet Nanocomposite Electrodes for Supercapacitors," U.S. patent application Ser. No. 11/906,786 (Oct. 4, 2007).
3. Aruna Zhamu and Bor Z. Jang, "Graphite-Carbon Composite Electrodes for Supercapacitors" U.S. patent application Ser. No. 11/895,657 (Aug. 27, 2007).
4. Aruna Zhamu and Bor Z. Jang, "Method of Producing Graphite-Carbon Composite Electrodes for Supercapacitors" U.S. patent application Ser. No. 11/895,588 (Aug. 27, 2007).
5. Aruna Zhamu and Bor Z. Jang, "Graphene Nanocomposites for Electrochemical cell Electrodes," U.S. patent application Ser. No. 12/220,651 (Jul. 28, 2008).

However, individual nano graphene sheets have a great tendency to re-stack themselves, effectively reducing the specific surface areas that are accessible by the electrolyte in a supercapacitor electrode. The significance of this graphene sheet overlap issue may be illustrated as follows: For a nano graphene platelet with dimensions of l (length)×w (width)×t (thickness) and density ρ, the estimated surface area per unit mass is $S/m = (2/\rho)(1/l + 1/w + 1/t)$. With $\rho \cong 2.2$ g/cm$^3$, l=100 nm, w=100 nm, and t=0.34 nm (single layer), we have an impressive S/m value of 2,675 m$^2$/g, which is much greater than that of most commercially available carbon black or activated carbon materials used in the state-of-the-art supercapacitor. If two single-layer graphene sheets stack to form a double-layer graphene, the specific surface area is reduced to 1,345 m$^2$/g. For a three-layer graphene, t=1 nm, we have S/m=906 m$^2$/g. If more layers are stacked together, the specific surface area would be further significantly reduced.

These calculations suggest that it is critically important to find a way to prevent individual graphene sheets to re-stack and, even if they partially re-stack, the resulting multi-layer structure would still have inter-layer pores of adequate sizes. These pores must be sufficiently large to allow for accessibility by the electrolyte and to enable the formation of electric double-layer charges, which typically require a pore size of at least 1 nm, more preferably at least 2 nm. However, these pores or inter-graphene spacings must also be sufficiently small to ensure a large tap density. Unfortunately, the typical tap density of graphene-based electrode is less than 0.3 g/cm$^3$, and most typically <<0.1 g/cm$^3$. To a great extent, the requirement to have large pore sizes and high porosity level and the requirement to have a high tap density are considered mutually exclusive in supercapacitors.

Another major technical barrier to using graphene sheets as a supercapacitor electrode active material is the challenge of depositing a thick active material layer onto the surface of a solid current collector (e.g. Al foil) using the conventional graphene-solvent slurry coating procedure. In such an electrode, the graphene electrode typically requires a large amount of a binder resin (hence, significantly reduced active material proportion vs. non-active or overhead materials/components). In addition, any electrode prepared in this manner that is thicker than 50 μm is brittle and weak. There has been no effective solution to these problems.

Therefore, there is clear and urgent need for supercapacitors that have high active material mass loading (high areal density), active materials with high apparent density (high tap density), high electrode thickness without significantly decreasing the electron and ion transport rates (e.g. without a long electron transport distance), high volumetric capacitance, and high volumetric energy density. For graphene-based electrodes, one must also overcome problems such as re-stacking of graphene sheets, the demand for large proportion of a binder resin, and difficulty in producing thick graphene electrode layers.

Carbon is known to have five unique crystalline structures, including diamond, fullerene (0-D nano graphitic material), carbon nano-tube or carbon nano-fiber (1-D nano graphitic material), graphene (2-D nano graphitic material), and graphite (3-D graphitic material). The carbon nano-tube (CNT) refers to a tubular structure grown with a single wall or multi-wall. Carbon nano-tubes (CNTs) and carbon nano-fibers (CNFs) have a diameter on the order of a few nanometers to a few hundred nanometers. Their longitudinal, hollow structures impart unique mechanical, electrical and chemical properties to the material. The CNT or CNF is a one-dimensional nano carbon or 1-D nano graphite material.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004); and (3) B. Z. Jang, A. Zhamu, and J. Guo, "Process for Producing Nano-scaled Platelets and Nanocomposites," U.S. patent application Ser. No. 11/509,424 (Aug. 25, 2006).

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (>5% by weight of oxygen), slightly fluorinated graphene (<5% by weight of fluorine), graphene fluoride ((>5% by weight of fluorine), other halogenated graphene, and chemically functionalized graphene.

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of processable graphene sheets in large quantities is essential to the success in exploiting composite, energy, and other applications for graphene.

Our research group was among the first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. Four main prior-art approaches have been followed to produce NGPs. Their advantages and shortcomings are briefly summarized as follows:

A Review on Production of Isolated Nano Graphene Plates or Sheets (NGPs)

Approach 1: Chemical Formation and Reduction of Graphene Oxide (GO)

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d=½\ d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.
(2) The chemical treatment process requires a long intercalation and oxidation time, typically 5 hours to five days.
(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers.
(4) The thermal exfoliation requires a high temperature (typically 800-1,200° C.) and, hence, is a highly energy-intensive process.
(5) Both heat- and solution-induced exfoliation approaches require a very tedious washing and purification step. For instance, typically 2.5 kg of water is used to wash and recover 1 gram of GIC, producing huge quantities of waste water that need to be properly treated.
(6) In both the heat- and solution-induced exfoliation approaches, the resulting products are GO platelets that must undergo a further chemical reduction treatment to reduce the oxygen content. Typically even after reduction, the electrical conductivity of GO platelets remains much lower than that of pristine graphene. Furthermore, the reduction procedure often involves the utilization of toxic chemicals, such as hydrazine.
(7) Furthermore, the quantity of intercalation solution retained on the flakes after draining may range from 20 to 150 parts of solution by weight per 100 parts by weight of graphite flakes (pph) and more typically about 50 to 120 pph. During the high-temperature exfoliation, the residual intercalate species retained by the flakes decompose to produce various species of sulfuric and nitrous compounds (e.g., $NO_x$ and $SO_x$), which are undesirable. The effluents require expensive remediation procedures in order not to have an adverse environmental impact.

The present invention was made to overcome the limitations or problems outlined above.

Approach 2: Direct Formation of Pristine Nano Graphene Platelets

In 2002, our research team succeeded in isolating single-layer and multi-layer graphene sheets from partially carbonized or graphitized polymeric carbons, which were obtained from a polymer or pitch precursor [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating graphite with potassium melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs. The present invention was made to overcome the limitations outlined above.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. [Walt A. DeHeer, Claire Berger, Phillip N. First, "Patterned thin film graphite devices and method for making same" U.S. Pat. No. 7,327,000 B2 (Jun. 12, 2003)] Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications. The present invention was made to overcome the limitations outlined above.

Another process for producing graphene, in a thin film form (typically <2 nm in thickness), is the catalytic chemical vapor deposition process. This catalytic CVD involves catalytic decomposition of hydrocarbon gas (e.g. $C_2H_4$) on Ni or Cu surface to form single-layer or few-layer graphene. With Ni or Cu being the catalyst, carbon atoms obtained via decomposition of hydrocarbon gas molecules at a temperature of 800-1,000° C. are directly deposited onto Cu foil surface or precipitated out to the surface of a Ni foil from a Ni—C solid solution state to form a sheet of single-layer or few-layer graphene (less than 5 layers). The Ni- or Cu-catalyzed CVD process does not lend itself to the deposition of more than 5 graphene planes (typically <2 nm) beyond which the underlying Ni or Cu layer can no longer provide any catalytic effect. The CVD graphene films are extremely expensive.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets. The present invention was made to overcome the limitations outlined above.

Hence, an urgent need exists to have a graphene production process that requires a reduced amount of undesirable chemical (or elimination of these chemicals all together), shortened process time, less energy consumption, lower degree of graphene oxidation, reduced or eliminated effluents of undesirable chemical species into the drainage (e.g., sulfuric acid) or into the air (e.g., $SO_2$ and $NO_2$). The process should be able to produce more pristine (less oxidized and damaged), more electrically conductive, and larger/wider graphene sheets. Furthermore, one should be able to readily make these graphene sheets into a foam structure.

Our recent research has yielded a process for chemical-free production of isolated nano graphene platelets that is novel in that is does not follow the established methods for production of nano graphene platelets outlined above. In addition, the process is of enhanced utility in that it is cost effective, and provided novel graphene materials with significantly reduced environmental impact. Furthermore, as herein disclosed, we have combined the chemical-free production of graphene and the formation of a graphene-carbon hybrid form into one single operation.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently invented graphene-carbon foam can contain pristine or non-pristine graphene and the invented method allows for this flexibility.

A Review on Production of Graphene Foams

Generally speaking, a foam or foamed material is composed of pores (or cells) and pore walls (a solid material). The pores can be interconnected to form an open-cell foam. A graphene foam is composed of pores and pore walls that contain a graphene material. There are three major methods of producing graphene foams:

The first method is the hydrothermal reduction of graphene oxide hydrogel that typically involves sealing graphene oxide (GO) aqueous suspension in a high-pressure autoclave and heating the GO suspension under a high pressure (tens or hundreds of atm) at a temperature typically in the range of 180-300° C. for an extended period of time (typically 12-36 hours). A useful reference for this method is given here: Y. Xu, et al. "Self-Assembled Graphene Hydrogel via a One-Step Hydrothermal Process," ACS Nano 2010, 4, 4324-4330. There are several major issues associated with this method: (a) The high pressure requirement makes it an impractical method for industrial-scale production. For one thing, this process cannot be conducted on a continuous basis. (b) It is difficult, if not impossible, to exercise control over the pore size and the porosity level of the resulting porous structure. (c) There is no flexibility in terms of varying the shape and size of the resulting reduced graphene oxide (RGO) material (e.g. it cannot be made into a film shape). (d) The method involves the use of an ultra-low concentration of GO suspended in water (e.g. 2 mg/mL=2 g/L=2 kg/kL). With the removal of non-carbon elements (up to 50%), one can only produce less than 2 kg of graphene material (RGO) per 1000-liter suspension. Furthermore, it is practically impossible to operate a 1000-liter reactor that has to withstand the conditions of a high temperature and a high pressure. Clearly, this is not a scalable process for mass production of porous graphene structures.

The second method is based on a template-assisted catalytic CVD process, which involves CVD deposition of graphene on a sacrificial template (e.g. Ni foam). The graphene material conforms to the shape and dimensions of the Ni foam structure. The Ni foam is then etched away using an etching agent, leaving behind a monolith of graphene skeleton that is essentially an open-cell foam. A useful reference for this method is given here: Zongping Chen, et al., "Three-dimensional flexible and conductive interconnected graphene networks grown by chemical vapour deposition," Nature Materials, 10 (June 2011) 424-428. There are several problems associated with such a process: (a) the catalytic CVD is intrinsically a very slow, highly energy-intensive, and expensive process; (b) the etching agent is typically a highly undesirable chemical and the resulting Ni-containing etching solution is a source of pollution. It is very difficult and expensive to recover or recycle the dissolved Ni metal from the etchant solution. (c) It is challenging to maintain the shape and dimensions of the graphene foam without damaging the cell walls when the Ni foam is being etched away. The resulting graphene foam is typically very brittle and fragile. (d) The transport of the CVD precursor gas (e.g. hydrocarbon) into the interior of a metal foam can be difficult, resulting in a non-uniform structure, since certain spots inside the sacrificial metal foam may not be accessible to the CVD precursor gas.

The third method of producing graphene foam also makes use of a sacrificial material (e.g. colloidal polystyrene particles, PS) that is coated with graphene oxide sheets using a self-assembly approach. For instance, Choi, et al. prepared chemically modified graphene (CMG) paper in two steps: fabrication of free-standing PS/CMG films by vacuum filtration of a mixed aqueous colloidal suspension of CMG and PS (2.0 μm PS spheres), followed by removal of PS beads to generate 3D macro-pores. [B. G. Choi, et al., "3D Macroporous Graphene Frameworks for Supercapacitors with High Energy and Power Densities," ACS Nano, 6 (2012) 4020-4028.] Choi, et al. fabricated well-ordered free-standing PS/CMG paper by filtration, which began with separately preparing a negatively charged CMG colloidal and a positively charged PS suspension. A mixture of CMG colloidal and PS suspension was dispersed in solution under controlled pH (=2), where the two compounds had the same surface charges (zeta potential values of +13±2.4 mV for CMG and +68±5.6 mV for PS). When the pH was raised to 6, CMGs (zeta potential=−29±3.7 mV) and PS spheres (zeta potential=+51±2.5 mV) were assembled due to the electrostatic interactions and hydrophobic characteristics between them, and these were subsequently integrated into PS/CMG composite paper through a filtering process. This method also has several shortcomings: (a) This method requires very tedious chemical treatments of both graphene oxide and PS particles. (b) The removal of PS by toluene also leads to weakened macro-porous structures. (c) Toluene is a highly regulated chemical and must be treated with extreme caution. (d) The pore sizes are typically excessively big (e.g. several μm), too big for many useful applications.

The above discussion clearly indicates that every prior art method or process for producing graphene foams has major deficiencies. Thus, it is an object of the present invention to provide a cost-effective process for producing highly conductive, mechanically robust graphene-based foams (specifically, integral 3D graphene-carbon hybrid foam) in large quantities. This process does not involve the use of an environmentally unfriendly chemical. This process enables the flexible design and control of the porosity level and pore sizes.

It is another object of the present invention to provide a process for producing graphene-carbon hybrid foams that exhibit a thermal conductivity, electrical conductivity, elastic modulus, and/or strength that are comparable to or greater than those of the conventional graphite or carbon foams.

Yet another object of the present invention is to provide (a) a pristine graphene-based hybrid foam that contains essentially all carbon only and preferably have a meso-scaled pore size range (2-50 nm); and (b) non-pristine graphene foams (graphene fluoride, graphene chloride, nitrogenated graphene, etc.) that contains at least 0.001% by weight (typically from 0.01% to 25% by weight and most typically from 0.1% to 20%) of non-carbon elements that can be used for a broad array of applications.

Another object of the present invention is to provide products (e.g. devices) that contain a graphene-carbon foam of the present invention and methods of operating these products.

SUMMARY OF THE INVENTION

The present invention provides an integral 3D graphene-carbon hybrid foam-based supercapacitor electrode and a process for producing such an electrode directly from particles of a graphitic material and particles of a polymer. This process is stunningly simple. The invention also provides a supercapacitor containing such a unique electrode (as an anode, as a cathode, or both electrodes having such type of electrode).

The supercapacitor having an anode, a cathode, a porous separator electronically separating the anode and the cathode, and/or an electrolyte in ionic contact with the anode and the cathode, wherein at least one of the anode and the cathode contains an integral 3D graphene-carbon hybrid foam as an electrode active material that forms electric double layers of charges or redox pairs. The hybrid foam is composed of multiple pores and pore walls, wherein the pore walls contain single-layer or few-layer graphene sheets chemically bonded by a carbon material. In other words, the hybrid foam has both graphene sheets and a carbon phase (two distinct types of materials) as the pore wall materials and the carbon material-to-graphene weight ratio is preferably from 1/200 to ½.

The few-layer graphene sheets have 2-10 layers of stacked graphene planes having an inter-plane spacing $d_{002}$ from 0.3354 nm to 0.40 nm as measured by X-ray diffraction and the single-layer or few-layer graphene sheets contain a pristine graphene material having essentially zero % of non-carbon elements, or a non-pristine graphene material having an adjustable 0.001% to 25% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

The supercapacitor may further comprise an anode current collector in contact with the anode, and/or a cathode current collector in contact with the cathode. In a preferred embodiment, one or both primary surfaces of a current collector (e.g. Al foil) is coated with a layer of the presently invented integral 3D graphene-carbon hybrid foam.

In this supercapacitor, the 3D graphene foam typically has a density from 0.005 to 1.7 g/cm$^3$ (preferably from 0.1 to 1.7 g/cm$^3$), a specific surface area from 50 to 3,200 m$^2$/g (more typically from 300 to 3,200 m$^2$/g), a thermal conductivity of at least 200 W/mK per unit of specific gravity, and/or an electrical conductivity no less than 2,000 S/cm per unit of specific gravity. Preferably, the average pore size in the hybrid foam is from 2 nm to 50 nm, and the specific surface area is from 500 m$^2$/g to 3,200 m$^2$/g.

In some embodiments, the pore walls contain a non-pristine graphene material and the hybrid foam contains a content of non-carbon elements in the range of 0.01% to 20% by weight and the non-carbon elements include an element selected from oxygen, fluorine, chlorine, bromine, iodine, nitrogen, hydrogen, or boron.

In some very unique embodiments, the supercapacitor is in a continuous-length filament, wire, or sheet form having a thickness or diameter from 200 nm to 10 cm.

In the supercapacitor, the pore walls typically contain a 3D network of interconnected graphene planes. In some embodiments, the foam has a physical density higher than 0.8 g/cm$^3$ and a specific surface area greater than 800 m$^2$/g. In certain embodiments, the hybrid foam has a physical density higher than 1.0 g/cm$^3$ and a specific surface area greater than 500 m$^2$/g.

The anode active material or cathode active material of the supercapacitor may further contain a redox pair partner material selected from a metal oxide, a conducting polymer (e.g. polyaniline, polypyrrole, polyacetylene, polythiophene, etc.), a non-conducting polymer (e.g. polyacrylonitrile), an organic material, an inorganic material, or a combination thereof, wherein the partner material is combined with the graphene sheets or carbon material in the hybrid foam to form redox pairs for pseudo-capacitance. This significantly increases the specific capacitance of the supercapacitor. The metal oxide may be selected from $RuO_2$, $IrO_2$, $NiO$, $MnO_2$, $VO_2$, $V_2O_5$, $V_3O_8$, $TiO_2$, $Cr_2O_3$, $Co_2O_3$, $Co_3O_4$, $PbO_2$, $Ag_2O$, or a combination thereof.

In certain embodiments, the integral 3D graphene-carbon hybrid foam is chemically or physically activated to further increase the specific surface area.

Typically, the graphene-carbon hybrid foam constitutes an electrode active material loading greater than 10 mg/cm$^2$, and/or the hybrid foam constitutes an electrode layer having a thickness no less than 200 µm, and/or the anode active material and the cathode active material combined exceeds 30% by weight of the total supercapacitor cell weight. Preferably, the hybrid foam constitutes an electrode active material loading greater than 15 mg/cm$^2$, and/or the hybrid foam constitutes an electrode layer having a thickness no less than 300 µm, and/or the anode active material and the cathode active material combined exceeds 40% by weight of the supercapacitor cell. Further preferably, the hybrid foam constitutes an electrode active material loading greater than 20 mg/cm$^2$ and/or wherein the hybrid foam constitutes an electrode layer having a thickness no less than 400 µm, and/or the anode active material and the cathode active material combined exceeds 50% by weight of said supercapacitor cell. Most preferably, the hybrid foam constitutes an electrode active material loading greater than 30 mg/cm$^2$ and/or the hybrid foam constitutes an electrode layer having a thickness no less than 500 µm, and/or the anode active material and the cathode active material combined exceeds 60% by weight of the supercapacitor cell.

Also provided is a supercapacitor electrode comprising an integral 3D graphene-carbon hybrid foam herein invented. The present invention also provides a process for producing an electrode containing such an integral 3D graphene-carbon foam as an interconnected network of electrode active material. The process comprises:

(a) mixing multiple particles of a graphitic material and multiple particles of a solid polymer carrier material to form a mixture in an impacting chamber of an energy impacting apparatus;

(b) operating this energy impacting apparatus with a frequency and an intensity for a length of time sufficient for peeling off graphene sheets from the graphitic material and transferring the graphene sheets to surfaces of the solid polymer carrier material particles to produce graphene-coated or graphene-embedded polymer particles inside the impacting chamber; (e.g. The impacting apparatus, when in operation, imparts kinetic energy to polymer particles, which in turn impinge upon graphite particle surfaces/edges and peel off graphene sheets from the impacted graphite particles. These peeled-off graphene sheets stick to surfaces of these polymer particles. This is herein referred to as the "direct transfer" process, meaning that graphene sheets are directly transferred from graphite particles to surfaces of polymer particles without being mediated by any third-party entity.)

(c) recovering the graphene-coated or graphene-embedded polymer particles from the impacting chamber;

(d) consolidating the graphene-coated or graphene-embedded polymer particles into a desired shape (e.g. film or sheet) of graphene-polymer hybrid structure (this consolidating step can be as simple as a compacting step that just packs graphene-coated or embedded particles into a desired shape); and (e) pyrolyzing this shape (film or sheet) of graphene-polymer hybrid structure to thermally convert the polymer into pores and carbon or graphite that bonds the graphene sheets to form the integral 3D graphene-carbon hybrid foam, which is used as a supercapacitor electrode active material. This foam structure is basically composed of graphene sheets bonded at their ends/edges by a carbon phase. Since both graphene and converted carbon are capable of storing electric double layer (EDL) charges near their surfaces, they are both electrode active materials. There is no need to add any other active materials (such as isolated/separated graphene sheets and activated carbon particles) to the pores, just liquid or gel electrolyte.

In certain alternative embodiments, a plurality of impacting balls or media are added to the impacting chamber of the energy impacting apparatus. These impacting balls, accelerated by the impacting apparatus, impact the surfaces/edges of graphite particles and peel off graphene sheets therefrom. These graphene sheets are tentatively transferred to surfaces of these impacting balls. These graphene-supporting impacting balls subsequently impinge upon polymer particles and transfer the supported graphene sheets to the surfaces of these polymer particles. This sequence of events is herein referred to as the "indirect transfer" process. In some embodiments of the indirect transfer process, step (c) includes operating a magnet to separate the impacting balls or media from the graphene-coated or graphene-embedded polymer particles.

The solid polymer material particles can include plastic or rubber beads, pellets, spheres, wires, fibers, filaments, discs, ribbons, or rods, having a diameter or thickness from 10 nm to 10 mm. Preferably, the diameter or thickness is from 100 nm to 1 mm, and more preferably from 200 nm to 200 μm. The solid polymer may be selected from solid particles of a thermoplastic, thermoset resin, rubber, semi-penetrating network polymer, penetrating network polymer, natural polymer, or a combination thereof. In an embodiment, the solid polymer is partially removed by melting, etching, or dissolving in a solvent prior to step (d).

In certain embodiments, the graphitic material is selected from natural graphite, synthetic graphite, highly oriented pyrolytic graphite, graphite fiber, graphitic nano-fiber, graphite fluoride, oxidized graphite, chemically modified graphite, exfoliated graphite, recompressed exfoliated graphite, expanded graphite, meso-carbon micro-bead, or a combination thereof. Preferably, the graphitic material contains a non-intercalated and non-oxidized graphitic material that has never been previously exposed to a chemical or oxidation treatment prior to the mixing step (a).

We have surprisingly observed that a broad array of impacting devices can be used for practicing the instant invention. For instance, the energy impacting apparatus can be a vibratory ball mill, planetary ball mill, high energy mill, basket mill, agitator ball mill, cryo ball mill, micro ball mill, tumbler ball mill, continuous ball mill, stirred ball mill, pressurized ball mill, freezer mill, vibratory sieve, bead mill, nano bead mill, ultrasonic homogenizer mill, centrifugal planetary mixer, vacuum ball mill, or resonant acoustic mixer.

For the formation of the carbon component of the resulting graphene-carbon hybrid foam, one can choose polymer particles that have a high carbon yield or char yield (e.g. >30% by weight). The carbon yield is the weight percentage of a polymer structure that is converted by heat to a solid carbon phase, instead of becoming part of a volatile gas. The high carbon-yield polymer may be selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof.

If a lower carbon content (higher graphene proportion) is desired in the graphene-carbon hybrid foam, the polymer can contain a low carbon-yield polymer selected from polyethylene, polypropylene, polybutylene, polyvinyl chloride, polycarbonate, acrylonitrile-butadiene (ABS), polyester, polyvinyl alcohol, poly vinylidiene fluoride (PVDF), polytetrafluoroethylene (PTFE), polyphenylene oxide (PPO), poly methyl methacrylate (PMMA), a copolymer thereof, a polymer blend thereof, or a combination thereof.

It may be noted that these polymers (both high and low carbon yields), when heated at a temperature of 300-2,500° C., are converted into a carbon material, which is preferentially nucleated near graphene sheet edges. Such a carbon material serves to bridge the gaps between graphene sheets, forming interconnected electron-conducting pathways. In other words, the resulting graphene-carbon hybrid foam is composed of integral 3D network of carbon-bonded graphene sheets, allowing continuous transport of electrons and phonons (quantized lattice vibrations) between graphene sheets or domains without interruptions. When further heated at a temperature higher than 2,500° C., the graphene-bonding carbon phase can get graphitized provided that the carbon phase is "soft carbon" or graphitizable. In such a situation, both the electric conductivity and thermal conductivity are further increased.

Thus, in certain embodiments, the step of pyrolyzing includes carbonizing the polymer at a temperature from 200° C. to 2,500° C. to obtain carbon-bonded graphene sheets. Optionally, the carbon-bonded graphene sheets can be subsequently graphitized at a temperature from 2,500° C. to 3,200° C. to obtain graphite-bonded graphene sheets.

It may be noted that pyrolyzation of a polymer tends to lead to the formation of pores in the resulting polymeric carbon phase due to the evolution of those volatile gas molecules such as $CO_2$ and $H_2O$. However, such pores also have a high tendency to get collapsed if the polymer is not constrained when being carbonized. We have surprisingly discovered that the graphene sheets wrapped around a polymer particle are capable of constraining the carbon pore walls from being shrunk and collapsed, while some carbon species also permeate to the gaps between graphene sheets where these species bond the graphene sheets together. The pore sizes and pore volume (porosity level) of the resulting 3D integral graphene foam depend upon the starting polymer size and the carbon yield of the polymer and, to a lesser extent, on the pyrolyzation temperature.

In certain preferred embodiments, the consolidating step includes compacting a mass of these graphene-coated polymer particles into a desired shape. For instance, by squeezing and compressing the mass of graphene-coated particles into a mold cavity one can readily form a compact green body. One can rapidly heat and melt the polymer, slightly compress the green body to slightly fuse the polymer particles together by heat, and rapidly cool to solidify the body. This consolidated body is then subjected to a pyrolysis treatment (polymer carbonization and, optionally, graphitization).

In some alternative embodiments, the consolidating step includes melting the polymer particles to form a polymer melt mixture with graphene sheets dispersed therein, forming the polymer melt mixture into a desired shape and solidifying the shape into a graphene-polymer composite structure. Such shape can be a rod, film (thin or thick film, wide or narrow, single sheets or in a roll), fiber (short filament or continuous long filament), plate, ingot, any regular shape or odd shape. This graphene-polymer composite shape is then pyrolyzed Alternatively, the consolidating step may include dissolving the polymer particles in a solvent to form a polymer solution mixture with graphene sheets dispersed therein, forming the polymer solution mixture into a desired shape, and removing the solvent to solidify the shape into the graphene-polymer composite structure. This composite structure is then pyrolyzed to form a porous structure.

The consolidating step may include melting the polymer particles to form a polymer melt mixture with graphene sheets dispersed therein and extruding the mixture into a rod form or sheet form, spinning the mixture into a fiber form, spraying the mixture into a powder form, or casting the mixture into an ingot form.

In some embodiments, the consolidating step includes dissolving the polymer particles in a solvent to form a polymer solution mixture with graphene sheets dispersed therein and extruding the solution mixture into a rod form or sheet form, spinning the solution mixture into a fiber form, spraying the solution mixture into a powder form, or casting the solution mixture into an ingot form, and removing the solvent.

In a specific embodiment, the polymer solution mixture is sprayed to create a graphene-polymer composite coating or film, which is then pyrolyzed (carbonized or carbonized and graphitized).

Preferably, the consolidating step may include compacting the graphene-coated polymer particles in a porous green compact having macroscopic pores and then infiltrate or impregnate the pores with an additional carbon source material selected from a petroleum pitch, coal tar pitch, an aromatic organic material (e.g. naphthalene or other derivatives of a pitch), a monomer, an organic polymer, or a combination thereof. The organic polymer may contain a high carbon-yield polymer selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof. When the infiltrated green compact of graphene-coated polymer particles is subjected to pyrolyzation, these species become additional sources of carbon, if a higher amount of carbon in the hybrid foam is desired.

It may be noted that there are no limitations on the shape or dimensions of the presently invented graphene-carbon hybrid foam. In a preferred embodiment, the integral graphene-carbon hybrid foam is made into a continuous-length roll sheet form (a roll of a continuous foam sheet) having a thickness no less than 100 nm and no greater than 10 cm and a length of at least 1 meter long, preferably at least 2 meters, further preferably at least 10 meters, and most preferably at least 100 meters. This sheet roll is produced by a roll-to-roll process. There has been no prior art graphene-based foam that is made into a sheet roll form. It has not been previously found or suggested possible to have a roll-to-roll process for producing a continuous length of graphene foam, either pristine or non-pristine based.

For EDLC supercapacitor applications, the graphene-carbon foam preferably has an oxygen content or non-carbon content less than 1% by weight, and the pore walls have stacked graphene planes having an inter-graphene spacing less than 0.35 nm, a thermal conductivity of at least 250 W/mK per unit of specific gravity, and/or an electrical conductivity no less than 2,500 S/cm per unit of specific gravity.

In a further preferred embodiment, the graphene-carbon hybrid foam has an oxygen content or non-carbon content less than 0.01% by weight and said pore walls contain stacked graphene planes having an inter-graphene spacing less than 0.34 nm, a thermal conductivity of at least 300 W/mK per unit of specific gravity, and/or an electrical conductivity no less than 3,000 S/cm per unit of specific gravity.

In yet another preferred embodiment, the graphene-carbon hybrid foam has an oxygen content or non-carbon content no greater than 0.01% by weight and said pore walls contain stacked graphene planes having an inter-graphene spacing less than 0.336 nm, a mosaic spread value no greater than 0.7, a thermal conductivity of at least 350 W/mK per unit of specific gravity, and/or an electrical conductivity no less than 3,500 S/cm per unit of specific gravity.

In still another preferred embodiment, the graphene foam has pore walls containing stacked graphene planes having an inter-graphene spacing less than 0.336 nm, a mosaic spread value no greater than 0.4, a thermal conductivity greater than 400 W/mK per unit of specific gravity, and/or an electrical conductivity greater than 4,000 S/cm per unit of specific gravity.

In a preferred embodiment, the pore walls contain stacked graphene planes having an inter-graphene spacing less than 0.337 nm and a mosaic spread value less than 1.0. In a preferred embodiment, the graphene foam exhibits a degree of graphitization no less than 80% (preferably no less than 90%) and/or a mosaic spread value less than 0.4. In a preferred embodiment, the pore walls contain a 3D network of interconnected graphene planes.

In a preferred embodiment, the solid graphene-carbon hybrid foam contains meso-scaled pores having a pore size from 2 nm to 50 nm. The solid graphene foam can also be made to contain micron-scaled pores (1-500 μm).

In certain embodiments, the step (d) of consolidating the graphene-coated or graphene-embedded polymer particles is conducted in a roll-to-roll manner to form a roll of graphene-polymer composite structure sheet or film, which is pyrolyzed to form a sheet or film of the integral 3D graphene-carbon hybrid foam. Preferably, the step (e) of pyrolyzation is followed by a step of chemically or physically activating the integral 3D graphene-carbon hybrid foam.

Also provided is a process for producing a continuous sheet of a supercapacitor. The process comprises the steps of laminating an anode layer, a separator/electrolyte layer, and a cathode layer, wherein at least the anode layer or the cathode layer contains a continuous sheet or film of the integral 3D graphene-carbon hybrid foam produced by the presently invented process. The continuous sheet or film of the hybrid foam is pre-loaded with a liquid or gel electrolyte prior to being laminated to form a supercapacitor sheet. Such a sheet-like supercapacitor can be rolled up, twisted, or folded back and forth to make many unique shapes.

DESCRIPTION OF THE PREFERRED EMBODIMENTS

Figure 1:
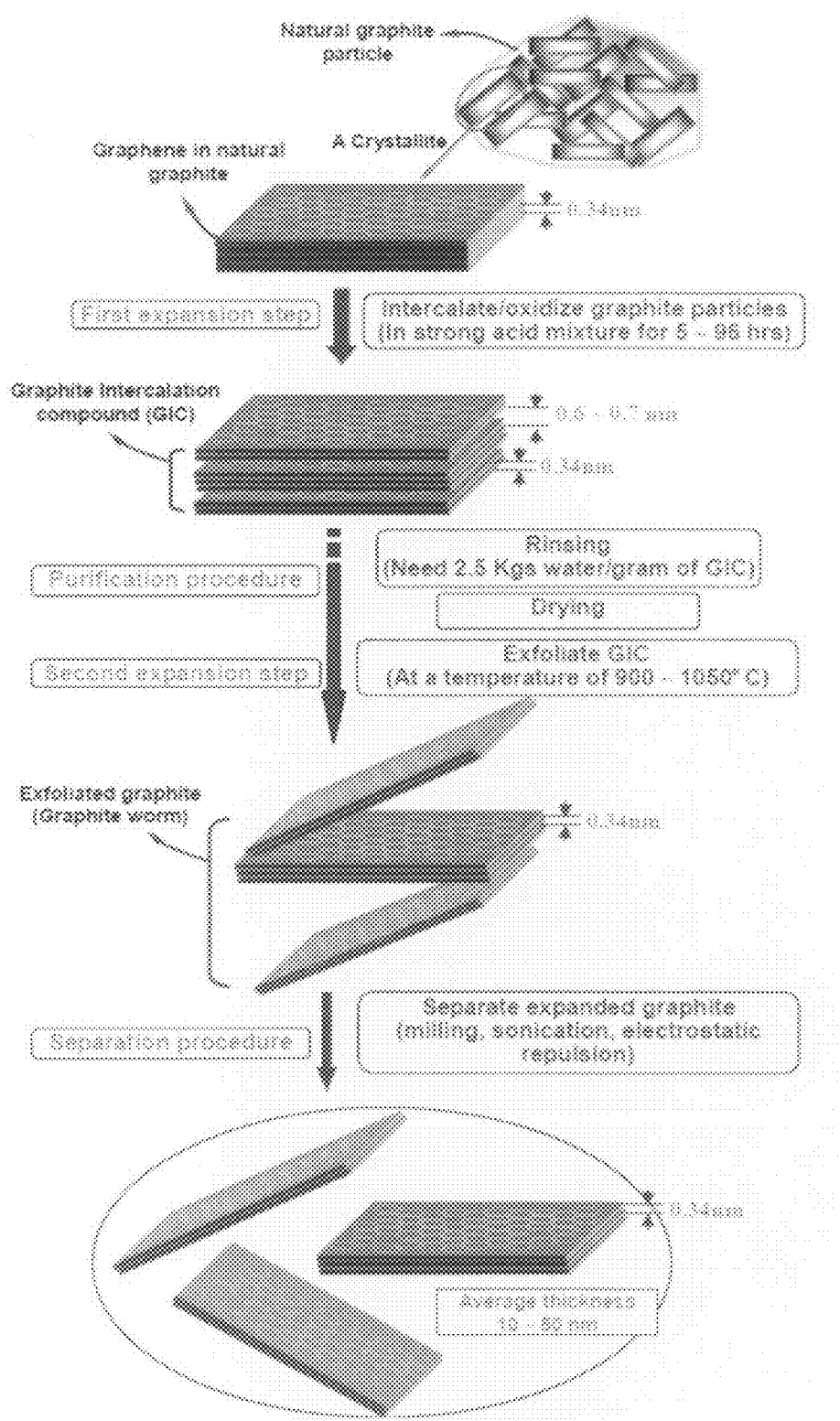
FIG. 1 A flow chart showing the most commonly used prior art process of producing highly oxidized NGPs that entails tedious chemical oxidation/intercalation, rinsing, and high-temperature exfoliation procedures.
Figure 2A:
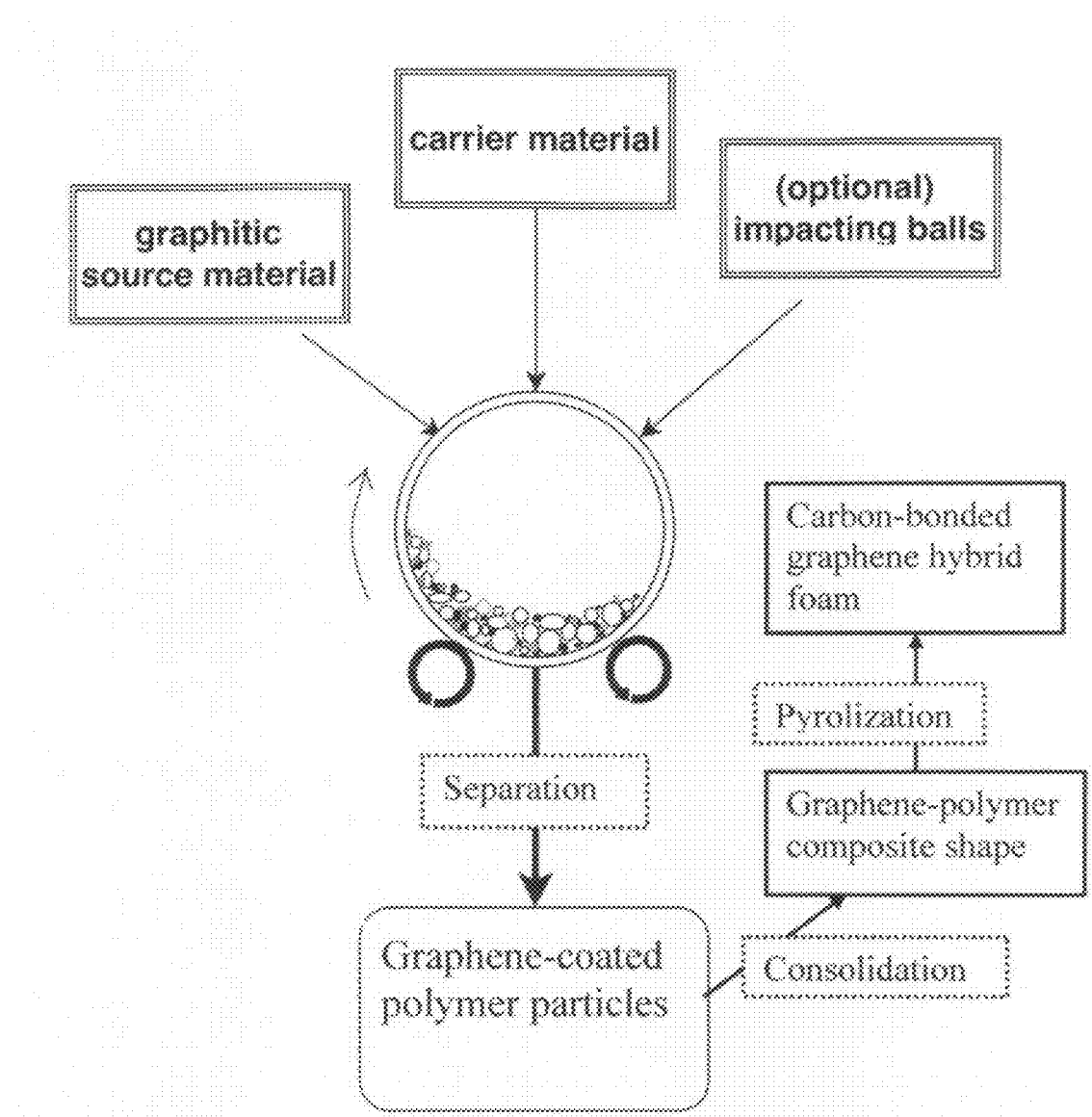
FIG. 2(A) A flow chart showing the presently invented process for producing integral 3D graphene-carbon hybrid foam.
Figure 2B:
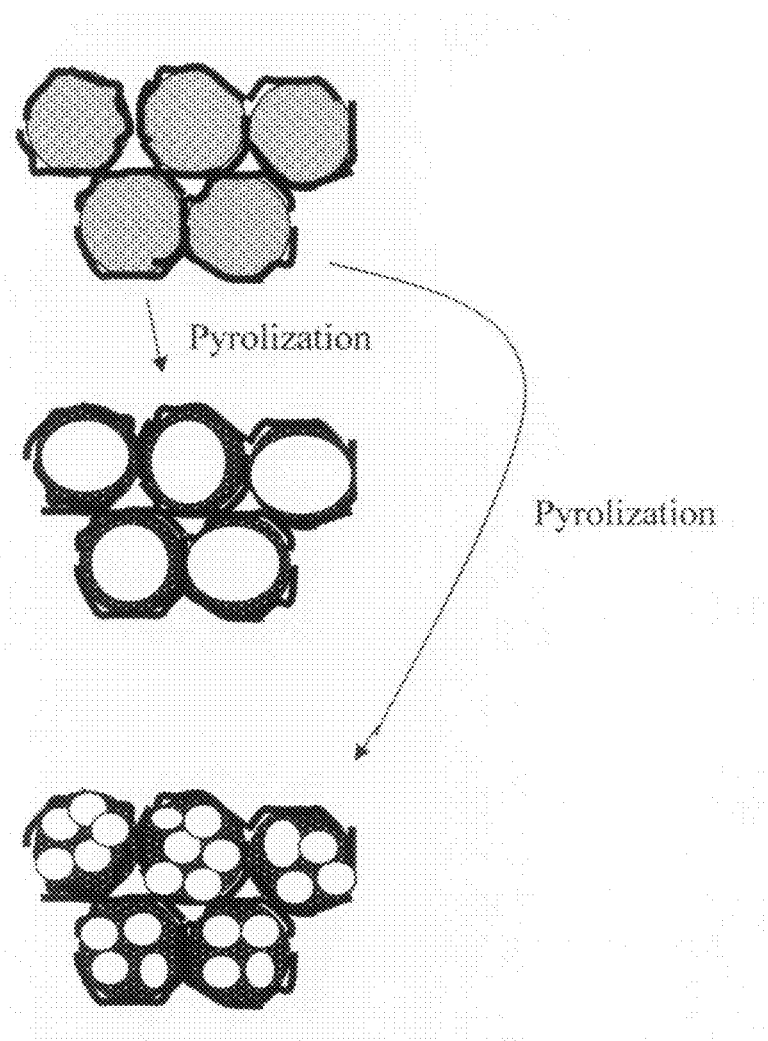
FIG. 2(B) Schematic of the heat-induced conversion of polymer into carbon, which bonds graphene sheets together to form a 3D graphene-carbon hybrid foam. The compacted structure of graphene-coated polymer particles is converted into a highly porous structure.
Figure 2C:
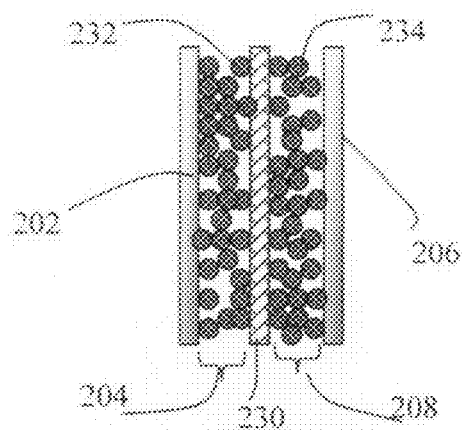
FIG. 2(C) Schematic of a prior art supercapacitor cell.
Figure 3A:
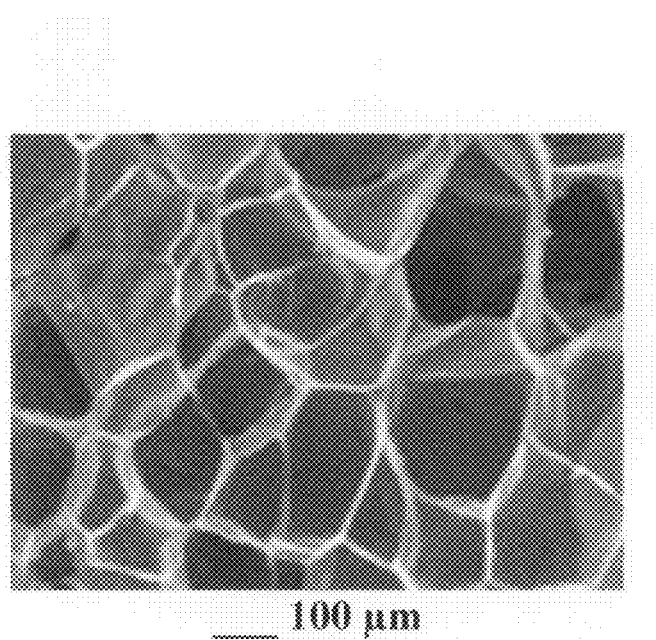
FIG. 3(A) An SEM image of an internal structure of a 3D graphene-carbon hybrid foam.
Figure 3B:
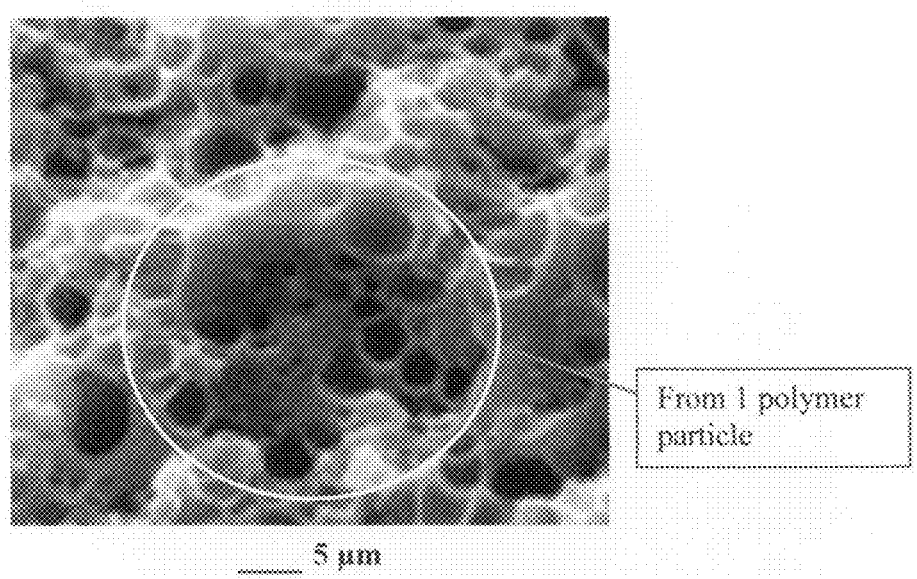
FIG. 3(B) An SEM image of an internal structure of another 3D graphene-carbon hybrid foam FIG. 4(A) Thermal conductivity values vs. specific gravity of a 3D integral graphene-carbon foam produced by the presently invented process, a meso-phase pitch-derived graphite foam, and a Ni foam-template assisted CVD graphene foam.

As schematically illustrated in FIG. 2(C), a prior art supercapacitor cell is typically composed of an anode current collector 202 (e.g. Al foil 12-15 μm thick), an anode active material layer 204 (containing an anode active material, such as activated carbon particles 232 and conductive additives that are bonded by a resin binder, such as PVDF), a porous separator 230, a cathode active material layer 208 (containing a cathode active material, such as activated carbon particles 234, and conductive additives that are all bonded by a resin binder, not shown), a cathode current collector 206 (e.g. Al foil), and a liquid electrolyte disposed in both the anode active material layer 204 (also simply referred to as the "anode layer") and the cathode active material layer 208 (or simply "cathode layer"). The entire cell is encased in a protective housing, such as a thin plastic-aluminum foil laminate-based envelop.

The prior art supercapacitor cell is typically made by a process that includes the following steps:

a) The first step is mixing particles of the anode active material (e.g. activated carbon), a conductive filler (e.g. graphite flakes), a resin binder (e.g. PVDF) in a solvent (e.g. NMP) to form an anode slurry. On a separate basis, particles of the cathode active material (e.g. activated carbon), a conductive filler (e.g. acetylene black), a resin binder (e.g. PVDF) are mixed and dispersed in a solvent (e.g. NMP) to form a cathode slurry.

b) The second step includes coating the anode slurry onto one or both primary surfaces of an anode current collector (e.g. Cu or Al foil), drying the coated layer by vaporizing the solvent (e.g. NMP) to form a dried anode electrode coated on Cu or Al foil. Similarly, the cathode slurry is coated and dried to form a dried cathode electrode coated on Al foil.

c) The third step includes laminating an anode/Al foil sheet, a porous separator layer, and a cathode/Al foil sheet together to form a 3-layer or 5-layer assembly, which is cut and slit into desired sizes and stacked to form a rectangular structure (as an example of shape) or rolled into a cylindrical cell structure.

d) The rectangular or cylindrical laminated structure is then encased in an aluminum-plastic laminated envelope or steel casing.

e) A liquid electrolyte is then injected into the laminated structure to make a supercapacitor cell.

There are several serious problems associated with this conventional process and the resulting supercapacitor cell:

1) It is very difficult to produce an electrode layer (anode layer or cathode layer) that is thicker than 100 μm and practically impossible or impractical to produce an electrode layer thicker than 200 μm. There are several reasons why this is the case. An electrode of 100 μm thickness typically requires a heating zone of 30-50 meters long in a slurry coating facility, which is too time consuming, too energy intensive, and not cost-effective. For some electrode active materials, such as graphene sheets, it has not been possible to produce an electrode thicker than 50 μm in a real manufacturing environment on a continuous basis. This is despite the notion that some thicker electrodes have been claimed in open or patent literature, which were prepared in a laboratory on a small scale. In a laboratory setting, presumably one could repeatedly add new materials to a layer and manually consolidate the layer to increase the thickness of an electrode. However, even with such a procedure, the resulting electrode becomes very fragile and brittle. This is even worse for graphene-based electrodes, since repeated compressions lead to re-stacking of graphene sheets and, hence, significantly reduced specific surface area and reduced specific capacitance.

2) With a conventional process, as depicted in FIG. 2(C), the actual mass loadings of the electrodes and the apparent densities for the active materials are too low. In most cases, the active material mass loadings of the electrodes (areal density) is significantly lower than 10 mg/cm$^2$ and the apparent volume density or tap density of the active material is typically less than 0.75 g/cm$^3$ (more typically less than 0.5 g/cm$^3$ and most typically less than 0.3 g/cm$^3$) even for relatively large particles of activated carbon. In addition, there are so many other non-active materials (e.g. conductive additive and resin binder) that add additional weights and volumes to the electrode without contributing to the cell capacity. These low areal densities and low volume densities result in relatively low volumetric capacitances and low volumetric energy density.

3) The conventional process requires dispersing electrode active materials (anode active material and cathode active material) in a liquid solvent (e.g. NMP) to make a wet slurry and, upon coating on a current collector surface, the liquid solvent has to be removed to dry the electrode layer. Once the anode and cathode layers, along with a separator layer, are laminated together and packaged in a housing to make a supercapacitor cell, one then injects a liquid electrolyte into the cell. In actuality, one makes the two electrodes wet, then makes the electrodes dry, and finally makes them wet again. Such a wet-dry-wet process does not sound like a good process at all.

4) Current supercapacitors (e.g. symmetric supercapacitors or electric double layer capacitors, EDLC) still suffer from a relatively low gravimetric energy density and low volumetric energy density. Commercially available EDLCs exhibit a gravimetric energy density of approximately 6 Wh/kg and no experimental EDLC cells have been reported to exhibit an energy density higher than 10 Wh/kg (based on the total cell weight) at room temperature. Although experimental supercapacitors exhibit large volumetric electrode capacitances (100 to 200 F/cm$^3$ in most cases) at the electrode level (not the cell level), their typical active mass loading of <1 mg/cm$^2$, tap density of <0.1 g/cm$^{-3}$, and electrode thicknesses of up to tens of micrometers remain significantly lower than those used in most commercially available electrochemical capacitors, resulting in energy storage devices with relatively low areal and volumetric capacities and low volumetric energy densities based on the cell (device) weight.

In literature, the energy density data reported based on either the active material weight alone or electrode weight cannot directly translate into the energy densities of a practical supercapacitor cell or device. The "overhead weight" or weights of other device components (binder, conductive additive, current collectors, separator, electrolyte, and packaging) must also be taken into account. The convention production process results in an active material proportion being less than 30% by weight of the total cell weight (<15% in some cases; e.g. for graphene-based active material).

The present invention provides a process for producing a supercapacitor cell having a high electrode thickness (no theoretical limitation on the electrode thickness that can be made by using the present process), high active material mass loading, low overhead weight and volume, high volumetric capacitance, and high volumetric energy density. The electrode produced can be directly impregnated with an electrolyte (aqueous, organic, ionic liquid, or polymer gel) without going through the lengthy and environmentally unfriendly wet-dry-wet procedures of the prior art process The present invention provides a method of producing an integral 3D graphene-carbon hybrid foam-based electrode directly from particles of a graphitic material and particles of a polymer. As schematically illustrated in FIG. 2(A), the method begins with mixing multiple particles of a graphitic material and multiple particles of a solid polymer carrier material to form a mixture, which is enclosed in an impacting chamber of an energy impacting apparatus (e.g. a vibratory ball mill, planetary ball mill, high energy mill, basket mill, agitator ball mill, cryo ball mill, micro ball mill, tumbler ball mill, continuous ball mill, stirred ball mill, pressurized ball mill, freezer mill, vibratory sieve, bead mill, nano bead mill, ultrasonic homogenizer mill, centrifugal planetary mixer, vacuum ball mill, or resonant acoustic mixer). When in operation, this energy impacting device imparts kinetic energy to the solid particles contained therein, allowing polymer particles to impinge upon graphite particles with high intensity and high frequency.

In typical operational conditions, such impacting events result in peeling off of graphene sheets from the graphitic material and transferring the graphene sheets to surfaces of the solid polymer carrier particles. These graphene sheets wrap around polymer particles to form graphene-coated or graphene-embedded polymer particles inside the impacting chamber. This is herein referred to as the "direct transfer" process, meaning that graphene sheets are directly transferred from graphite particles to surfaces of polymer particles without being mediated by any third-party entities.

Alternatively, a plurality of impacting balls or media can be added to the impacting chamber of the energy impacting apparatus. These impacting balls, accelerated by the impacting apparatus, impinge upon the surfaces/edges of graphite particles with a high kinetic energy at a favorable angle to peel off graphene sheets from graphite particles. These graphene sheets are tentatively transferred to surfaces of these impacting balls. These graphene-supporting impacting balls subsequently collide with polymer particles and transfer the supported graphene sheets to the surfaces of these polymer particles. This sequence of events is herein referred to as the "indirect transfer" process. These events occur in very high frequency and, hence, most of the polymer particles are covered by graphene sheets typically in less than one hour. In some embodiments of the indirect transfer process, step (c) includes operating a magnet to separate the impacting balls or media from the graphene-coated or graphene-embedded polymer particles.

The method then includes recovering the graphene-coated or graphene-embedded polymer particles from the impacting chamber and consolidating the graphene-coated or graphene-embedded polymer particles into a desired shape of graphene-polymer composite structure. This consolidating step can be as simple as a compacting step that just mechanically packs graphene-coated or embedded particles into a desired shape. Alternatively, this consolidating step can entail melting the polymer particles to form a polymer matrix with graphene sheets dispersed therein. Such a graphene-polymer structure can be in any practical shape or dimensions (sheet, film, fiber, rod, plate, cylinder, or any regular shape or odd shape).

The graphene-polymer compact or composite structure is then pyrolyzed to thermally convert the polymer into carbon or graphite that bonds the graphene sheets to form the integral 3D graphene-carbon hybrid foam.

Such a foam structure can be already in the final shape and dimensions of a desired electrode, or can be cut and trimmed into a final shape and dimensions of a desired electrode. Such an electrode can be directly impregnated with an electrolyte to form an electrolyte-impregnated foam electrode layer (e.g. a cathode). A counter electrode layer (e.g. an anode) may be made in a similar manner (if for an EDLC supercapacitor cell) or by using a different process (if for a lithium-ion capacitor, for instance). The anode layer, a separator, and the cathode layer can then be laminated (with or without an anode current collector and/or cathode current collector) to form a supercapacitor cell, which is then packaged in an envelop or casing (e.g. laminated plastic-aluminum housing). Alternatively, an un-impregnated anode layer, a separator layer, and an un-impregnated cathode layer are laminated together (with or without externally added current collectors) to form a supercapacitor cell, which is inserted in a housing and impregnated with an electrolyte to form a packaged cell.

For the formation of the carbon component of the integral 3D graphene-carbon hybrid foam, one can choose polymer particles that have a high carbon yield or char yield (e.g. >30% by weight of a polymer being converted to a solid carbon phase; instead of becoming part of a volatile gas). The high carbon-yield polymer may be selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof. When pyrolyzed, particles of these polymers become porous, as illustrated in the bottom portion of FIG. 2(B).

If a lower carbon content (higher graphene proportion relative to carbon proportion) and lower foam density are desired in the graphene-carbon hybrid foam, the polymer can contain a low carbon-yield polymer selected from polyethylene, polypropylene, polybutylene, polyvinyl chloride, polycarbonate, acrylonitrile-butadiene (ABS), polyester, polyvinyl alcohol, poly vinylidiene fluoride (PVDF), polytetrafluoroethylene (PTFE), polyphenylene oxide (PPO), poly methyl methacrylate (PMMA), a copolymer thereof, a polymer blend thereof, or a combination thereof. When pyrolyzed, particles of these polymers become porous, as illustrated in the middle portion of FIG. 2(B).

These polymers (of both high and low carbon yields), when heated at a temperature of 300-2,500° C., are converted into a carbon material, which is preferentially nucleated near graphene sheet edges. Such a carbon material naturally bridges the gaps between graphene sheets, forming interconnected electron-conducting pathways. In actuality, the resulting graphene-carbon hybrid foam is composed of integral 3D network of carbon-bonded graphene sheets, enabling continuous transport of electrons and phonons (quantized lattice vibrations) between graphene sheets or domains without interruptions. When further heated at a temperature higher than 2,500° C., the carbon phase can get graphitized to further increase both the electric conductivity and thermal conductivity. The amount of non-carbon elements is also decreased to typically below 1% by weight if the graphitization time exceeds 1 hour.

It may be noted that an organic polymer typically contains a significant amount of non-carbon elements, which can be reduced or eliminated via heat treatments. As such, pyrolyzation of a polymer causes the formation and evolution of volatile gas molecules, such as $CO_2$ and $H_2O$, which lead to the formation of pores in the resulting polymeric carbon phase. However, such pores also have a high tendency to get collapsed if the polymer is not constrained when being carbonized (the carbon structure can shrink while non-carbon elements are being released). We have surprising discovered that the graphene sheets wrapped around a polymer particle are capable of constraining the carbon pore walls from being collapsed. In the meantime, some carbon species also permeate to the gaps between graphene sheets where these species bond the graphene sheets together. The pore sizes and pore volume (porosity level) of the resulting 3D integral graphene foam mainly depend upon the starting polymer size and the carbon yield of the polymer.

The graphitic material, as a source of graphene sheets, may be selected from natural graphite, synthetic graphite, highly oriented pyrolytic graphite, graphite fiber, graphitic nano-fiber, graphite fluoride, oxidized graphite, chemically modified graphite, exfoliated graphite, recompressed exfoliated graphite, expanded graphite, meso-carbon micro-bead, or a combination thereof. In this regard, there are several additional surprising elements associated with the presently invented process:
  (1) Graphene sheets can be peeled off from natural graphite by using polymer particles alone, without utilizing the heavier and harder impacting balls (such as zirconium dioxide or steel balls commonly used in a ball mill, for instance). The peeled-off graphene sheets are directly transferred to polymer particle surfaces and are firmly wrapped around the polymer particles.
  (2) It is also surprising that impacting polymer particles are capable of peeling off graphene sheets from artificial graphite, such as meso-carbon micro-beads (MC-MBs), which are known to have a skin layer of amorphous carbon.
  (3) With the assistance of harder impacting balls, the graphene-like planes of carbon atoms constituting the internal structure of a carbon or graphite fiber can also be peeled off and transferred to the polymer particle surfaces. This has never been taught or suggested in prior art.
  (4) The present invention provides a strikingly simple, fast, scalable, environmentally benign, and cost-effective process that avoids essentially all of the drawbacks associated with prior art processes of producing graphene sheets. The graphene sheets are immediately transferred to and wrapped around the polymer particles, which are then readily converted to integral 3D graphene-carbon hybrid foam.

A certain desired degree of hydrophilicity can be imparted to the pore walls of the graphene-carbon hybrid foam if the starting graphite is intentionally oxidized to some degree (e.g. to contain 2-15% by weight of oxygen). Alternatively, one can attach oxygen-containing functional groups to the carbon phase if the carbonization treatment is allowed to occur in a slightly oxidizing environment.

If a high electrical or thermal conductivity is desired, the graphitic material may be selected from a non-intercalated and non-oxidized graphitic material that has never been previously exposed to a chemical or oxidation treatment prior to being placed into the impacting chamber. Alternatively or additionally, the graphene-carbon foam can be subjected to graphitization treatment at a temperature higher than 2,500° C. The resulting material is particularly advantageous for use as a supercapacitor electrode due to its high electrical conductivity (meaning exceptionally low internal resistance). A low equivalent series resistance in a supercapacitor cell is essential to achieving a high power density.

The graphene-carbon foam may be subjected to compression during and/or after the graphitization treatment. This operation enables us to adjust the graphene sheet orientation and the degree of porosity.

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354 g+0.344 (1-g)$, where $d_{002}$ is the interlayer spacing of graphite or graphene crystal in nm. This equation is valid only when $d_{002}$ is equal or less than approximately 0.3440 nm. The graphene foam walls having a $d_{002}$ higher than 0.3440 nm reflects the presence of oxygen- or fluorine-containing functional groups (such as —F, —OH, >O, and —COOH on graphene molecular plane surfaces or edges) that act as a spacer to increase the inter-graphene spacing.

Another structural index that can be used to characterize the degree of ordering of the stacked and bonded graphene planes in the foam walls of graphene and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our graphene walls have a mosaic spread value in this range of 0.2-0.4 (if produced with a heat treatment temperature (HTT) no less than 2,500° C.). However, some values are in the range of 0.4-0.7 if the HTT is between 1,500 and 2,500° C., and in the range of 0.7-1.0 if the HTT is between 300 and 1,500° C.

In-depth studies using a combination of SEM, TEM, selected area diffraction, X-ray diffraction, AFM, Raman spectroscopy, and FTIR indicate that the graphene foam walls are composed of several huge graphene planes (with length/width typically >>20 nm, more typically >>100 nm, often >>1 µm, and, in many cases, >>10 µm, or even >>100 µm). These giant graphene planes are stacked and bonded along the thickness direction (crystallographic c-axis direction) often through not just the van der Waals forces (as in conventional graphite crystallites), but also covalent bonds, if the final heat treatment temperature is lower than 2,500° C. In these cases, wishing not to be limited by theory, but Raman and FTIR spectroscopy studies appear to indicate the co-existence of $sp^2$ (dominating) and $sp^3$ (weak but existing) electronic configurations, not just the conventional $sp^2$ in graphite.

The integral 3D graphene-carbon hybrid foam is composed of multiple pores and pore walls, wherein the pore walls contain single-layer or few-layer graphene sheets chemically bonded by a carbon material having a carbon material-to-graphene weight ratio from 1/100 to 1/2, wherein the few-layer graphene sheets have 2-10 layers of stacked graphene planes having an inter-plane spacing $d_{002}$ from 0.3354 nm to 0.36 nm as measured by X-ray diffraction and the single-layer or few-layer graphene sheets contain a pristine graphene material having essentially zero % of non-carbon elements, or a non-pristine graphene material having 0.01% to 25% by weight of non-carbon elements (more typically <15%) wherein the non-pristine graphene is selected from graphene oxide, reduced graphene oxide, graphene fluoride, graphene chloride, graphene bromide, graphene iodide, hydrogenated graphene, nitrogenated graphene, chemically functionalized graphene, or a combination thereof. A plurality of single-layer or few layer graphene embracing the underlying polymer particles can overlap with one another to form a stack of graphene sheets. The stack can have a thickness greater than 5 nm and, in some cases, greater than 10 nm or even greater than 100 nm.

The integral 3D graphene-carbon hybrid foam typically has a density from 0.001 to 1.7 $g/cm^3$, a specific surface area from 50 to 3,000 $m^2/g$, a thermal conductivity of at least 200 W/mK per unit of specific gravity, and/or an electrical conductivity no less than 2,000 S/cm per unit of specific gravity. In a preferred embodiment, the pore walls contain stacked graphene planes having an inter-planar spacing $d_{002}$ from 0.3354 nm to 0.40 nm as measured by X-ray diffraction.

Many of the graphene sheets can be merged edge to edge through covalent bonds with one another, into an integrated graphene entity. The gaps between the free ends of those unmerged sheets or shorter merged sheets are bonded by the carbon phase converted from a polymer. Due to these unique chemical composition (including oxygen or fluorine content, etc.), morphology, crystal structure (including inter-graphene spacing), and structural features (e.g. degree of orientations, few defects, chemical bonding and no gap between graphene sheets, and substantially no interruptions along graphene plane directions), the graphene-carbon hybrid foam has a unique combination of outstanding thermal conductivity, electrical conductivity, mechanical strength, and stiffness (elastic modulus).

The aforementioned features and characteristics make the integral 3D graphene-carbon hybrid foam an ideal supercapacitor electrode for the following reasons.

1) Both the graphene sheets and the bridging carbon material are electrode active materials per se for developing electric double layers of charges (EDLC) near the interfaces between graphene or carbon surfaces and electrolyte. There is no need to add other electrode active materials (e.g. activated carbon particles or other separated/isolated graphene sheets) as an electrode active material.
2) Since graphene sheets are bonded by a carbon phase to form an integral 3D network of graphene planes and inter-dispersing pores, there is no possibility for otherwise isolated/separated graphene sheets to get re-stacked together (thereby reducing the specific surface area). Re-stacking of graphene sheets is the single most serious problem associated with using graphene sheets as a supercapacitor electrode active material. There are no isolated, un-bonded graphene sheets in the 3D integral hybrid foam to re-stack with one another.
3) Such a 3D network of graphene sheets bridged with a carbon phase also provides a 3D network of electron-conducting pathways without interruption, allowing for low resistance to electron transport.
4) There are no externally added conductive additives (such as ethylene black) and no resin binder used, which implies a minimal amount of non-active materials (materials that otherwise add extra weights and volumes to the supercapacitor cell without adding capacitance).
5) There is the flexibility of impregnating the hybrid foam electrode with the electrolyte before or after the electrode is laminated with the counter electrode and a separator layer into a cell. A surprisingly advantageous feature of this hybrid foam structure is the flexibility of making the pores initially large in size and chemically wettable and accessible to the electrolyte fluid. Once a desired amount of electrolyte is impregnated, the impregnated foam can be compressed to reduce the pore sizes and the electrode thickness and volume (without reducing the specific surface area of the graphene sheets). This feature now makes it possible to achieve both a high specific surface area and a high tap density of an electrode, which are normally considered mutually exclusive in prior art supercapacitor electrodes (either activated carbon or graphene-based). It is now possible to achieve both high volumetric energy density and high gravimetric energy density.
6) The 3D graphene-carbon hybrid structure and chemistry can be readily adjusted to accept a transition metal oxide or conductive polymer (in a coating or nano particle form) that forms a redox pair with the graphene sheets or the carbon phase for achieving pseudo-capacitance. This dramatically increases the energy density of the resulting supercapacitor.
7) Thus, the presently invented process exhibits a host of many totally unexpected advantages over the conventional supercapacitor cell production process.

Despite the fact that individual graphene sheets (prepared by prior art processes) can have an exceptionally high specific surface area, graphene sheets have a great tendency to re-stack together or to overlap with one another, thereby dramatically reducing the specific capacitance due to the significantly reduced specific surface area that is accessible by the electrolyte. This tendency to re-stack is particularly acute during the supercapacitor cell electrode production process. In this process, graphene sheets, along with other conductive additive and resin binder (e.g. PVDF), are dispersed in a solvent (typically NMP) to form a slurry, which is then coated on a surface of a solid current collector (e.g. Al foil). The solvent is then removed (vaporized) to form a dried layer of active material electrode, which is then fed through a pair of rollers in a compression machine to consolidate the electrode layer. These drying and compressing procedures induce severe graphene re-stacking. In many of the scientific reports, even though the graphene sheets in an original powder form were found to exhibit an exceptionally high specific surface area, the resulting electrode only shows an unexpectedly lower specific capacitance. Theoretically, the maximum specific capacitance of a single-layer graphene-based supercapacitor is as high as 550 F/g (based on an EDLC structure, no redox pair or pseudo-capacitance), but experimentally achieved values have been in the range of mere 90-170 F/g. This has been a long-standing problem in the art of supercapacitors.

The present invention provides a highly innovative and elegant process to overcome this graphene sheet re-stacking issue. This invented process completely eliminates the need to go through slurry coating, drying, and roll-pressing procedures. Instead of forming a slurry containing an environmentally undesirable solvent (i.e. NMP), the process entails directly injecting liquid electrolyte into a foamed structure. No subsequent drying and roll-compressing are required and no possibility of graphene sheets re-stacking together.

The 3D graphene-carbon hybrid foam may be further subjected to the following treatments, separately or in combination:

(a) Being chemically functionalized or doped with atomic, ionic, or molecular species. Useful surface functional groups may include quinone, hydroquinone, quaternized aromatic amines, mercaptans, or disulfides. This class of functional groups can impart pseudo-capacitance to graphene-based supercapacitors.

(b) coated or grafted with an intrinsically conductive polymer (conducting polymers, such as polyacetylene, polypyrrole, polyaniline, polythiophene, and their derivatives, are good choices for use in the present invention); These treatments are intended for further increasing the capacitance value through pseudo-capacitance effects such as redox reactions.

(c) deposition with transition metal oxides or sulfides, such as $RuO_2$, $TiO_2$, $MnO_2$, $Cr_2O_3$, and $Co_2O_3$, for the purpose of forming redox pairs with graphene sheets, thereby imparting pseudo-capacitance to the electrode; and (d) subjected to an activation treatment (analogous to activation of carbon black materials) to create additional surfaces and possibly imparting functional chemical groups to these surfaces. The activation treatment can be accomplished through $CO_2$ physical activation, KOH chemical activation, or exposure to nitric acid, fluorine, or ammonia plasma.

In the instant invention, there is no limitation on the type of liquid or gel electrolytes that can be used in the supercapacitor: aqueous, organic, gel, and ionic liquid. Typically, electrolytes for supercapacitors consist of solvent and dissolved chemicals (e.g. salts) that dissociate into positive ions (cations) and negative ions (anions), making the electrolyte electrically conductive. The more ions the electrolyte contains, the better its conductivity, which also influences the capacitance. In supercapacitors, the electrolyte provides the molecules for the separating monolayer in the Helmholtz double-layer (electric double layer) and delivers the ions for pseudocapacitance.

Water is a relatively good solvent for dissolving inorganic chemicals. When added together with acids such as sulfuric acid ($H_2SO_4$), alkalis such as potassium hydroxide (KOH), or salts such as quaternary phosphonium salts, sodium perchlorate ($NaClO_4$), lithium perchlorate ($LiClO_4$) or lithium hexafluoride arsenate ($LiAsF_6$), water offers relatively high conductivity values. Aqueous electrolytes have a dissociation voltage of 1.15 V per electrode and a relatively low operating temperature range. Water electrolyte-based supercapacitors exhibit low energy density.

Alternatively, electrolytes may contain organic solvents, such as acetonitrile, propylene carbonate, tetrahydrofuran, diethyl carbonate, γ-butyrolactone, and solutes with quaternary ammonium salts or alkyl ammonium salts such as tetraethylammonium tetrafluoroborate ($N(Et)_4BF_4$) or triethyl (methyl) tetrafluoroborate ($NMe(Et)_3BF_4$). Organic electrolytes are more expensive than aqueous electrolytes, but they have a higher dissociation voltage of typically 1.35 V per electrode (2.7 V capacitor voltage), and a higher temperature range. The lower electrical conductivity of organic solvents (10 to 60 mS/cm) leads to a lower power density, but a higher energy density since the energy density is proportional to the square of the voltage.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to −300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2,3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2,3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a supercapacitor.

In order to make a pseudo-capacitor (a supercapacitor that works on the development of pseudo-capacitance through redox pair formation), the anode active material or cathode active material may be designed to contain graphene sheets and a redox pair partner material selected from a metal oxide, a conducting polymer (e.g. conjugate-chain polymers), a non-conducting polymer (e.g. polyacrylonitrile, PAN), an organic material (e.g. hydroquinone), a non-graphene carbon material, an inorganic material, or a combination thereof. Many of the materials that can pair up with reduced graphene oxide sheets are well-known in the art. In this study, we have come to realize that graphene halogenide (e.g. graphene fluoride), graphene hydrogenide, and nitrogenated graphene can work with a wide variety of partner materials to form a redox pair for developing pseudo-capacitance.

For instance, the metal oxide or inorganic materials that serve in such a role include $RuO_2$, $IrO_2$, NiO, $MnO_2$, $VO_2$, $V_2O_5$, $V_3O_8$, $TiO_2$, $Cr_2O_3$, $Co_2O_3$, $Co_3O_4$, $PbO_2$, $Ag_2O$, $MoC_x$, $Mo_2N$, or a combination thereof. In general, the inorganic material may be selected from a metal carbide, metal nitride, metal boride, metal dichalcogenide, or a combination thereof. Preferably, the desired metal oxide or inorganic material is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form. These materials can be in the form of a simple mixture with sheets of a graphene material, but preferably in a nano particle or nano coating form that that is physically or chemically bonded to a surface of the graphene sheets prior to be formed into a slurry and injected into the pores of the porous current collectors.

The following examples are used to illustrate some specific details about the best modes of practicing the instant invention and should not be construed as limiting the scope of the invention.

Example 1: Production of Graphene-Carbon Hybrid Foam from Flake Graphite Via Polypropylene Powder-Based Solid Polymer Carrier Particles In an experiment, 1 kg of polypropylene (PP) pellets, 50 grams of flake graphite, 50 mesh (average particle size 0.18 mm; Asbury Carbons, Asbury N.J.) and 250 grams of magnetic steel balls were placed in a high-energy ball mill container. The ball mill was operated at 300 rpm for 2 hours. The container lid was removed and stainless steel balls were removed via a magnet. The polymer carrier material was found to be coated with a dark graphene layer. Carrier material was placed over a 50 mesh sieve and a small amount of unprocessed flake graphite was removed.

A sample of the coated carrier material was then immersed in tetrachloroethylene at 80° C. for 24 hours to dissolve PP and allow graphene sheets to disperse in the organic solvent. After solvent removal, isolated graphene sheet powder was recovered (mostly few-layer graphene).

The remaining coated carrier material was then compacted in a mold cavity to form a green compact, which was then heat-treated in a sealed crucible at 350° C. and then at 600° C. for 2 hours to produce a graphene-carbon foam.

In a separate experiment, the same batch of PP pellets and flake graphite particles (without the impacting steel balls) were placed in the same high-energy ball mill container and the ball mill was operated under the same conditions for the same period of time. The results were compared with those obtained from impacting ball-assisted operation. The isolated graphene sheets isolated from PP particles, upon PP dissolution, are mostly single-layer graphene. The graphene-carbon foam produced from this process has a higher level of porosity (lower physical density).

Although polypropylene (PP) is herein used as an example, the carrier material for graphene-carbon hybrid foam production is not limited to PP. It could be any polymer (thermoplastic, thermoset, rubber, wax, mastic, gum, organic resin, etc.) provided the polymer can be made into a particulate form. It may be noted that un-cured or partially cured thermosetting resins (such as epoxide and imide-based oligomers or rubber) can be made into a particle form at room temperature or lower (e.g. cryogenic temperature). Hence, even partially cured thermosetting resin particles can be used as a polymer carrier.

Example 2: Graphene-Carbon Hybrid Foam Using Expanded Graphite (>100 nm in Thickness) as the Graphene Source and ABS as the Polymer Solid Carrier Particles In an experiment, 100 grams of ABS pellets, as solid carrier material particles, were placed in a 16 oz plastic container along with 5 grams of expanded graphite. This container was placed in an acoustic mixing unit (Resodyn Acoustic mixer) and processed for 30 minutes. After processing, carrier material was found to be coated with a thin layer of carbon. A small sample of carrier material was placed in acetone and subjected to ultrasound energy to speed dissolution of the ABS. The solution was filtered using an appropriate filter and washed four times with additional acetone. Subsequent to washing, filtrate was dried in a vacuum oven set at 60° C. for 2 hours. This sample was examined by optical microscopy and found to be graphene. The remaining pellets were extruded to create graphene-polymer sheets (1 mm thick), which were then carbonized to prepare graphene-carbon foam samples under different temperature and compression conditions.

Example 3: Production of Graphene-Carbon Hybrid Foam from Meso-Carbon Micro Beads (MCMBs as the Graphene Source Material)) and Polyacrylonitrile (PAN) Fibers (as Solid Carrier Particles)

In one example, 100 grams of PAN fiber segments (2 mm long as the carrier particles), 5 grams of MCMBs (China Steel Chemical Co., Taiwan), and 50 grams of zirconia beads were placed in a vibratory ball mill and processed for 2 hours. After the process was completed, the vibratory mill was then opened and the carrier material was found to be coated with a dark coating of graphene sheets. The zirconia particles, having distinctly different sizes and colors were manually removed. The graphene-coated PAN fibers were then compacted and melted together to form several composite films. The films were subjected to a heat treatment at 250° C. for 1 hour (in room air), 350° C. for 2 hours, and 1,000° C. for 2 hours (under an argon gas atmosphere) to obtain graphene-carbon foam layers. Half of the carbonized foam layers were then heated to 2,850° C. and maintained at this temperature for 0.5 hours.

Example 4: Particles of Cured Phenolic Resin as the Polymer Carrier in a Freezer Mill In one experiment, 10 grams of phenolic resin particles were placed in a SPEX mill sample holder (SPEX Sample Prep, Metuchen, N.J.) along with 0.25 grams of HOPG powder derived from graphitized polyimide and a magnetic stainless steel impactor. The same experiment was performed, but the sample holder did not contain any impactor balls. These processes were carried out in a 1%-humidity "dry room" to reduce the condensation of water onto the completed product. The SPEX mill was operated for 10-120 minutes. After operation, the contents of the sample holder were sorted to recover graphene-coated resin particles by removing residual HOPG powder and impactor balls (when used).

The resulting graphene-coated resin particles in both cases (with or without impactor balls) were examined using both digital optical microscopy and scanning electron microscopy (SEM). It was observed that the thickness of the graphene sheets wrapped around resin particles increases with the milling operation time and, given the same duration of operation, the impactor-assisted operation leads to thicker graphene coating.

A mass of graphene-coated resin particles was compressed to form a green compact, which was then infiltrated with a small amount of petroleum pitch. Separately, another green compact of graphene-coated resin particles was prepared under comparable conditions, but no pitch infiltration was attempted. The two compacts were then subjected to identical pyrolysis treatments.

Example 5: Natural Graphite Particles as the Graphene Source, Polyethylene (PE) or Nylon 6/6 Beads as the Solid Carrier Particles, and Ceramic or Glass Beads as Added Impacting Balls In an experiment, 0.5 kg of PE or nylon beads (as a solid carrier material), 50 grams of natural graphite (source of graphene sheets) and 250 grams of zirconia powder (impacting balls) were placed in containers of a planetary ball mill. The ball mill was operated at 300 rpm for 4 hours. The container lid was removed and zirconia beads (different sizes and weights than graphene-coated PE beads) were removed through a vibratory screen. The polymer carrier material particles were found to be coated with a dark graphene layer. Carrier material was placed over a 50 mesh sieve and a small amount of unprocessed flake graphite was removed. In a separate experiment, glass beads were used as the impacting balls; other ball-milling operation conditions remained the same.

A mass of graphene-coated PE pellets and a mass of graphene-coated nylon beads were separately compacted in a mold cavity and briefly heated above the melting point of PE or nylon and then rapidly cooled to form two green compacts. For comparison purposes, two corresponding compacts were prepared from a mass of un-coated PE pellets and a mass of un-coated nylon beads. These 4 compacts were then subjected to pyrolyzation (by heating the compacts in a chamber from 100° C. to 650° C.). The results were very surprising. The compacts of graphene-coated polymer particles were found to be converted to graphene-carbon hybrid foam structures having dimensions comparable to the dimensions of the original compacts (3 cm×3 cm×0.5 cm). SEM examination of these structures indicates that carbon phases are present near the edges of graphene sheets and these carbon phases act to bond the graphene sheets together. The carbon-bonded graphene sheets form a skeleton of graphene-carbon hybrid pore walls having pores being present in what used to be the space occupied by the original polymer particles, as schematically illustrated in FIG. 2(A).

In contrast, the two compacts from un-coated pellets or beads shrank to become essentially two solid masses of carbon having a volume approximately 15%-20% of the original compact volumes. These highly shrunk solid masses are practically pore-free carbon materials; they are not a foam material.

Examples 6: Micron-Sized Rubber Particles as the Solid Polymer Carrier Particles The experiment began with preparation of micron-sized rubber particles. A mixture of methylhydro dimethyl-siloxane polymer (20 g) and polydimethylsiloxane, vinyldimethyl terminated polymer (30 g) was obtained by using a homogenizer under ambient conditions for 1 minute. Tween 80 (4.6 g) was added and the mixture was homogenized for 20 seconds. Platinum-divinyltetramethyldisiloxane complex (0.5 g in 15 g methanol) was added and mixed for 10 seconds. This mixture was added to 350 g of distilled water and a stable latex was obtained by homogenization for 15 minutes. The latex was heated to 60° C. for 15 hours. The latex was then de-emulsified with anhydrous sodium sulfate (20 g) and the silicone rubber particles were obtained by filtration under a vacuum, washing with distilled water, and drying under vacuum at 25° C. The particle size distribution of the resulting rubber particles was 3-11 μm.

In one example, 10 grams of rubber particles, 2 grams of natural graphite, and 5 grams of zirconia beads were placed in a vibratory ball mill and processed for 2 hours. After the process was completed, the vibratory mill was then opened and the rubber particles were found to be coated with a dark coating of graphene sheets. The zirconia particles were manually removed. The graphene-coated rubber particles were then mixed with 5% by wt. of petroleum pitch (as a binder) and mechanically compacted together to form several composite sheets. The composite sheets were then subjected to a heat treatment at 350° C. for 1 hour, 650° C. for 2 hours, and 1,000° C. for 1 hour in a tube furnace to obtain graphene-carbon foam layers.

Examples 7: Preparation of Graphene Fluoride-Carbon Hybrid Foams

In a typical procedure, a sheet of graphene-carbon hybrid foam was fluorinated by vapors of chlorine trifluoride in a sealed autoclave reactor to yield fluorinated graphene-carbon hybrid film. Different durations of fluorination time were allowed for achieving different degrees of fluorination. Sheets of fluorinated graphene-carbon foam were then separately immersed in containers each containing a chloroform-water mixture. We observed that these foam sheets selectively absorb chloroform from water and the amount of chloroform absorbed increases with the degree of fluorination until the fluorine content reaches 7.3% by wt.

Example 8: Preparation of Graphene Oxide-Carbon Hybrid Foam and Nitrogenataed Graphene-Carbon Hybrid Foams Several pieces of graphene-carbon foam prepared in Example 3 were immersed in a 30% $H_2O_2$-water solution for a period of 2-48 hours to obtain graphene oxide (GO) foams, having an oxygen content of 2-25% by weight.

Some GO foam samples were mixed with different proportions of urea and the mixtures were heated in a microwave reactor (900 W) for 0.5 to 5 minutes. The products were washed several times with deionized water and vacuum dried. The products obtained were nitrogenated graphene foam. The nitrogen contents were from 3% to 17.5 wt. %, as measured by elemental analysis.

It may be noted that different functionalization treatments of the graphene-carbon hybrid foam were for different purposes. For instance, oxidized graphene-carbon hybrid foam structures are particularly effective as an absorber of oil from an oil-water mixture (i.e. oil spilled on water and then mixed together). In this case, the integral 3D graphene (0-15% by wt. oxygen)-carbon foam structures are both hydrophobic and oleophilic. A surface or a material is said to be hydrophobic if water is repelled from this material or surface and that a droplet of water placed on a hydrophobic surface or material will form a large contact angle. A surface or a material is said to be oleophilic if it has a strong affinity for oils and not for water.

Different contents of O, F, and/or N also enable the presently invented graphene-carbon hybrid foams to absorb different organic solvents from water, or to separate one organic solvent from a mixture of multiple solvents.

Comparative Example 1: Graphene Via Hummer's Process and Carbonization of the Graphene-Polymer Composite Graphite oxide as prepared by oxidation of graphite flakes with sulfuric acid, nitrate, and permanganate according to the method of Hummers [U.S. Pat. No. 2,798,878, Jul. 9, 1957]. Upon completion of the reaction, the mixture was poured into deionized water and filtered. The graphite oxide was repeatedly washed in a 5% solution of HCl to remove most of the sulphate ions. The sample was then washed repeatedly with deionized water until the pH of the filtrate was neutral. The slurry was spray-dried and stored in a vacuum oven at 60° C. for 24 hours. The interlayer spacing of the resulting laminar graphite oxide was determined by the Debey-Scherrer X-ray technique to be approximately 0.73 nm (7.3 A). A sample of this material was subsequently transferred to a furnace pre-set at 650° C. for 4 minutes for exfoliation and heated in an inert atmosphere furnace at 1200° C. for 4 hours to create a low density powder comprised of few-layer reduced graphene oxide (RGO). Surface area was measured via nitrogen adsorption BET. This powder was subsequently dry mixed at a 1%-25% loading level with ABS, PE, PP, and nylon pellets, respectively, and compounded using a 25 mm twin screw extruder to form composite sheets. These composite sheets were then pyrolyzed.

Comparative Example 2: Preparation of Single-Layer Graphene Oxide (GO) Sheets from Meso-Carbon Micro-Beads (MCMBs) and then Production of Graphene Foam Layers from GO Sheets Meso-carbon microbeads (MCMBs) were supplied from China Steel Chemical Co., Kaohsiung, Taiwan. This material has a density of about 2.24 $g/cm^3$ with a median particle size of about 16 µm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.5. The slurry was then subjected ultra-sonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. GO sheets were suspended in water. Baking soda (5-20% by weight), as a chemical blowing agent, was added to the suspension just prior to casting. The suspension was then cast onto a glass surface. Several samples were cast, some containing a blowing agent and some not. The resulting GO films, after removal of liquid, have a thickness that can be varied from approximately 10 to 500 µm. Several sheets of the GO film, with or without a blowing agent, were then subjected to heat treatments that involve a heat temperature of 80-500° C. for 1-5 hours, which generated a graphene foam structure.

Comparative Example 3: Preparation of Pristine Graphene Foam (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a graphene foam having a higher thermal conductivity. Pristine graphene sheets were produced by using the direct ultrasonication process (also known as the liquid-phase exfoliation in the art).

In a typical procedure, five grams of graphite flakes, ground to approximately 20 µm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

Various amounts (1%-30% by weight relative to graphene material) of chemical bowing agents (N, N-Dinitroso pentamethylene tetramine or 4. 4'-Oxybis (benzenesulfonyl hydrazide) were added to a suspension containing pristine graphene sheets and a surfactant. The suspension was then cast onto a glass surface. Several samples were cast, including one that was made using $CO_2$ as a physical blowing agent introduced into the suspension just prior to casting. The resulting graphene films, after removal of liquid, have a thickness that can be varied from approximately 10 to 100 µm. The graphene films were then subjected to heat treatments at a temperature of 80-1,500° C. for 1-5 hours, which generated a graphene foam.

Comparative Example 4: CVD Graphene Foams on Ni Foam Templates

The procedure was adapted from that disclosed in open literature: Chen, Z. et al. "Three-dimensional flexible and conductive interconnected graphene networks grown by chemical vapor deposition," Nat. Mater. 10, 424-428 (2011). Nickel foam, a porous structure with an interconnected 3D scaffold of nickel was chosen as a template for the growth of graphene foam. Briefly, carbon was introduced into a nickel foam by decomposing $CH_4$ at 1,000° C. under ambient pressure, and graphene films were then deposited on the surface of the nickel foam. Due to the difference in the thermal expansion coefficients between nickel and graphene, ripples and wrinkles were formed on the graphene films. In order to recover (separate) graphene foam, Ni frame must be etched away. Before etching away the nickel skeleton by a hot HCl (or $FeCl_3$) solution, a thin layer of poly(methyl methacrylate) (PMMA) was deposited on the surface of the graphene films as a support to prevent the graphene network from collapsing during nickel etching. After the PMMA layer was carefully removed by hot acetone, a fragile graphene foam sample was obtained. The use of the PMMA support layer is critical to preparing a free-standing film of graphene foam; only a severely distorted and deformed graphene foam sample was obtained without the PMMA support layer. This is a tedious process that is not environmentally benign and is not scalable.

Comparative Example 5: Conventional Graphitic Foam from Pitch-Based Carbon Foams Pitch powder, granules, or pellets are placed in a aluminum mold with the desired final shape of the foam. Mitsubishi ARA-24 meso-phase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C./min. The temperature was held for at least 15 minutes to achieve a soak and then the furnace power was turned off and cooled to room temperature at a rate of approximately 1.5 degree C./min with release of pressure at a rate of approximately 2 psi/min. Final foam temperatures were 630° C. and 800° C. During the cooling cycle, pressure is released gradually to atmospheric conditions. The foam was then heat treated to 1050° C. (carbonized) under a nitrogen blanket and then heat treated in separate runs in a graphite crucible to 2500° C. and 2800° C. (graphitized) in Argon.

Figure 6:
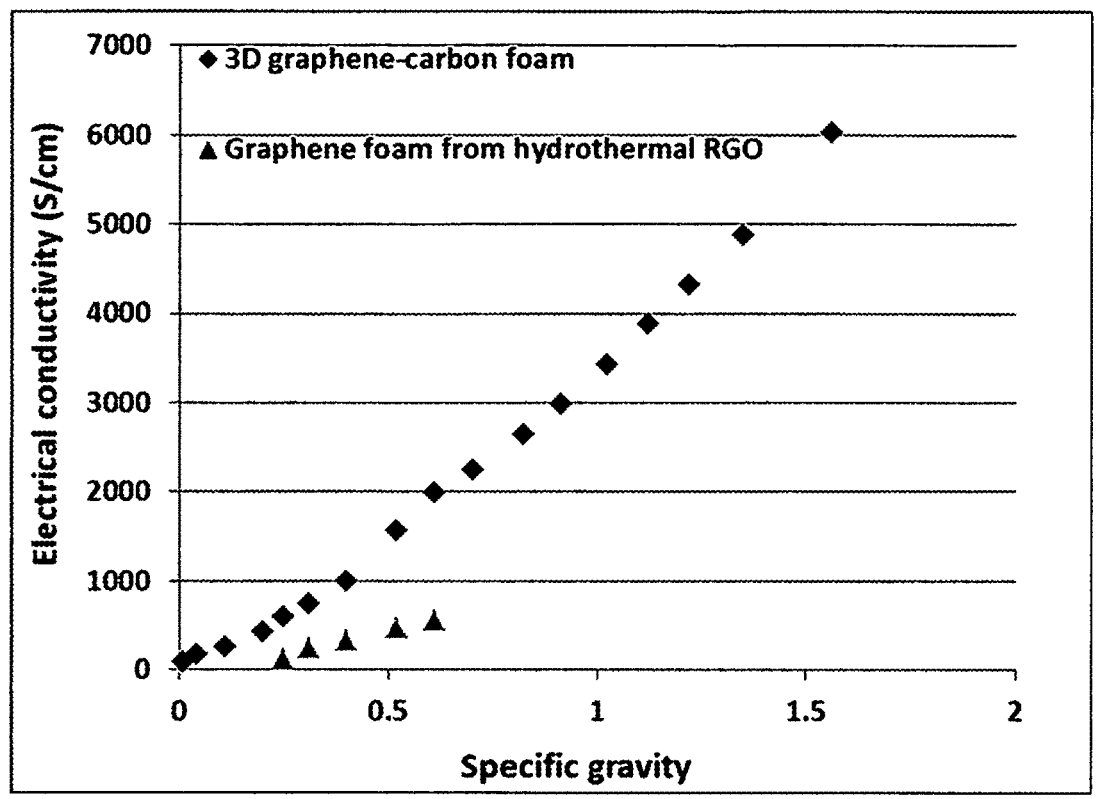
FIG. 6 Electrical conductivity values of 3D graphene-carbon foam and the hydrothermally reduced GO graphene foam.

Comparative Example 6: Graphene Foams from Hydrothermally Reduced Graphene Oxide For comparison, a self-assembled graphene hydrogel (SGH) sample was prepared by a one-step hydrothermal method. In a typical procedure, the SGH can be easily prepared by heating 2 mg/mL of homogeneous graphene oxide (GO) aqueous dispersion sealed in a Teflon-lined autoclave at 180° C. for 12 h. The SGH containing about 2.6% (by weight) graphene sheets and 97.4% water has an electrical conductivity of approximately $5 \times 10^{-3}$ S/cm. Upon drying and heat treating at 1,500° C., the resulting graphene foam exhibits an electrical conductivity of approximately $1.5 \times 10^{-1}$ S/cm, which is 2 times lower than those of the presently invented graphene foams produced by heat treating at the same temperature. FIG. 6 shows some electrical conductivity values of 3D graphene-carbon foam and the hydrothermally reduced GO graphene foam.

Example 9: Thermal and Mechanical Testing of Various Graphene Foams and Conventional Graphite Foam Samples from various conventional carbon or graphene foam materials were machined into specimens for measuring the thermal conductivity. The bulk thermal conductivity of meso-phase pitch-derived foam ranged from 67 W/mK to 151 W/mK. The density of the samples was from 0.31-0.61 $g/cm^3$. When weight is taken into account, the specific thermal conductivity of the pitch derived foam is approximately 67/0.31=216 and 151/0.61=247.5 W/mK per specific gravity (or per physical density).

The compression strength of the samples having an average density of 0.51 $g/cm^3$ was measured to be 3.6 MPa and the compression modulus was measured to be 74 MPa. By contrast, the compression strength and compressive modulus of the presently invented graphene-carbon foam samples having a comparable physical density are 6.2 MPa and 113 MPa, respectively.

Figure 4A:
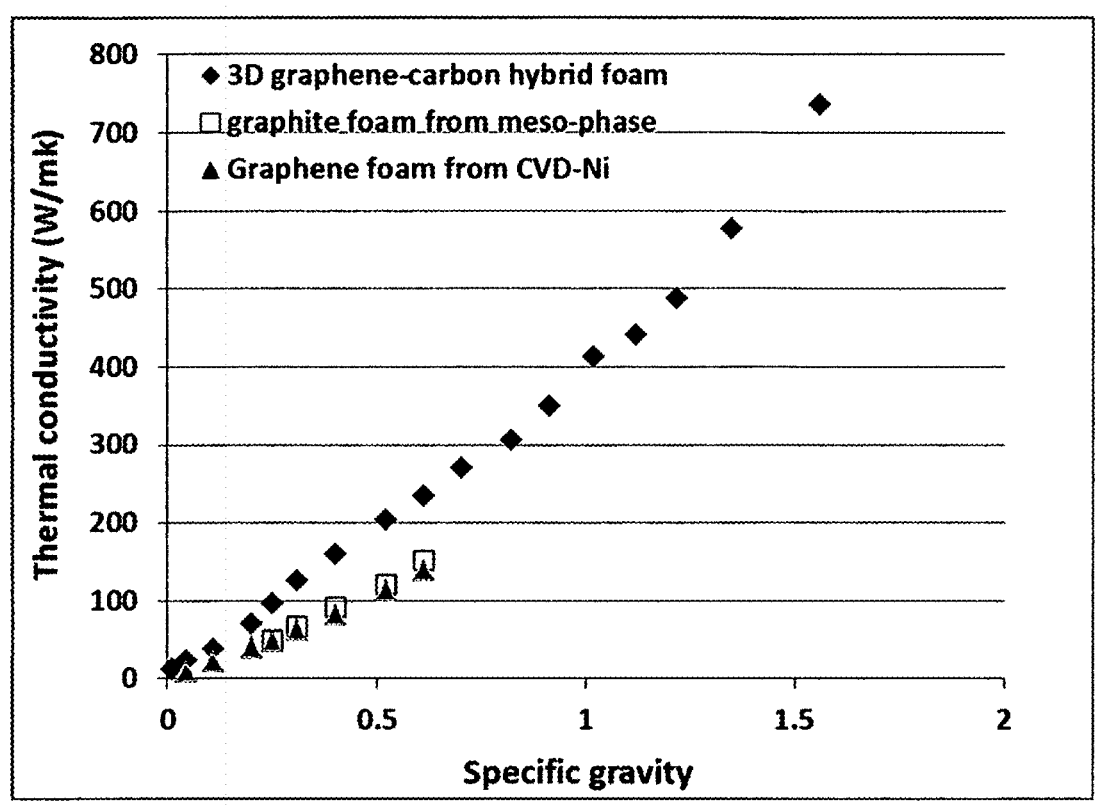
FIG. 4(B) Thermal conductivity values of 3D graphene-carbon foam and the hydrothermally reduced GO graphene foam.
Figure 5:
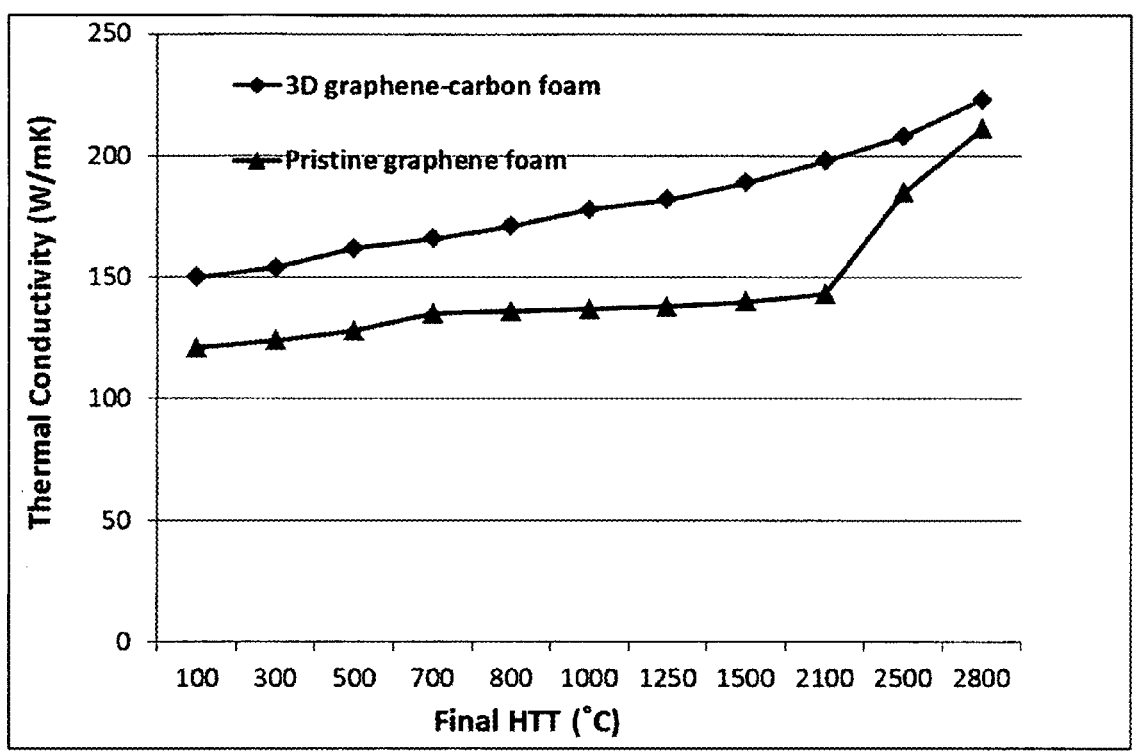
FIG. 5 Thermal conductivity values of 3D graphene-carbon hybrid foam and pristine graphene foam (prepared by casting with a blowing agent and then heat treating) plotted as a function of the final (maximum) heat treatment temperature.

Shown in FIG. 4(A) are the thermal conductivity values vs. specific gravity of the 3D graphene-carbon foam, meso-phase pitch-derived graphite foam, and Ni foam template-assisted CVD graphene foam. These data clearly demonstrate the following unexpected results:

1) The 3D integral graphene-carbon foams produced by the presently invented process exhibit significantly higher thermal conductivity as compared to both meso-phase pitch-derived graphite foam and Ni foam template-assisted CVD graphene, given the same physical density.
2) This is quite surprising in view of the notion that CVD graphene is essentially pristine graphene that has never been exposed to oxidation and should have exhibited a high thermal conductivity compared to our graphene-carbon hybrid foam. The carbon phase of the hybrid foam is in general of low degree of crystallinity (some being amorphous carbon) and, thus, has much lower thermal or electrical conductivity as compared with graphene alone. However, when the carbon phase is coupled with graphene sheets to form an integral structure produced by the presently invented method, the resulting hybrid form exhibits a thermal conductivity as compared to an all-pristine graphene foam. These exceptionally high thermal conductivity values observed with the graphene-carbon hybrid foams herein produced are much to our surprise. This is likely due to the observation that the otherwise isolated graphene sheets are now bonded by a carbon phase, providing a bridge for the uninterrupted transport of electrons and phonons.
3) The specific conductivity values of the presently invented hybrid foam materials exhibit values from 250 to 500 W/mK per unit of specific gravity; but those of other types of foam materials are typically lower than 250 W/mK per unit of specific gravity.
4) Summarized in FIG. 5 are thermal conductivity data for a series of 3D graphene-carbon foams and a series of pristine graphene derived foams, both plotted over the final (maximum) heat treatment temperatures. In both types of materials, the thermal conductivity increases monotonically with the final HTT. However, the presently invented process enables the cost-effective and environmentally benign production of graphene-carbon foams that outperform pristine graphene foams. This is another unexpected result.

Figure 4B:
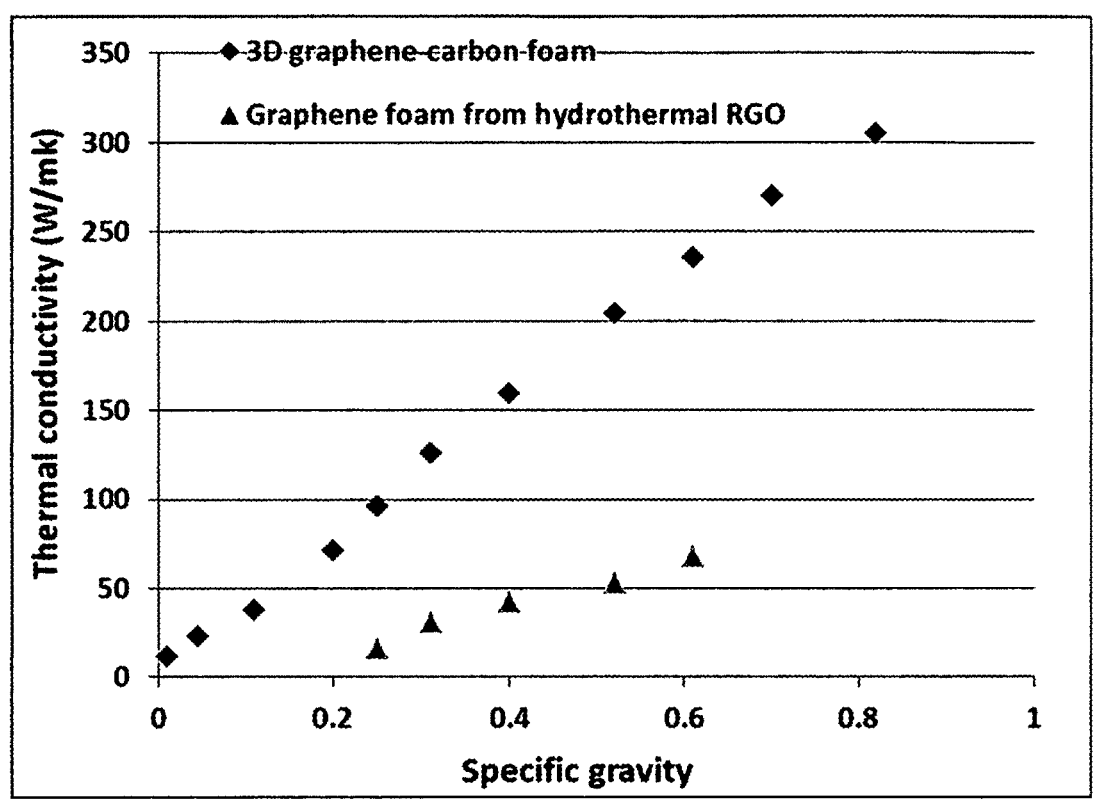

5) FIG. 4(B) shows the thermal conductivity values of the presently invented hybrid foam and hydrothermally reduced GO graphene foam. Electrical conductivity values of 3D graphene-carbon foam and the hydrothermally reduced GO graphene foam are shown in FIG. 6. These data further support the notion that, given the same amount of solid material, the presently invented graphene-carbon foam is intrinsically most conducting, reflecting the significance of continuity in electron and phonon transport paths. The carbon phase bridges the gaps or interruptions between graphene sheets.

Example 10: Characterization of Various Graphene Foams and Conventional Graphite Foam The internal structures (crystal structure and orientation) of several series of graphene-carbon foam materials were investigated using X-ray diffraction. The X-ray diffraction curve of natural graphite typically exhibits a peak at approximately $2\theta=26°$, corresponds to an inter-graphene spacing ($d_{002}$) of approximately 0.3345 nm. The graphene walls of the hybrid foam materials exhibit a $d_{002}$ spacing typically from 0.3345 nm to 0.40 nm, but more typically up to 0.34 nm.

With a heat treatment temperature of 2,750° C. for the foam structure under compression for one hour, the $d_{002}$ spacing is decreased to approximately to 0.3354 nm, identical to that of a graphite single crystal. In addition, a second diffraction peak with a high intensity appears at $2\theta=55°$ corresponding to X-ray diffraction from (004) plane. The (004) peak intensity relative to the (002) intensity on the same diffraction curve, or the I(004)/I(002) ratio, is a good indication of the degree of crystal perfection and preferred orientation of graphene planes. The (004) peak is either non-existing or relatively weak, with the I(004)/I(002) ratio <0.1, for all graphitic materials heat treated at a temperature lower than 2,800° C. The I(004)/I(002) ratio for the graphitic materials heat treated at 3,000-3,250° C. (e.g., highly oriented pyrolytic graphite, HOPG) is in the range of 0.2-0.5. In contrast, a graphene foam prepared with a final HTT of 2,750° C. for one hour exhibits a I(004)/I(002) ratio of 0.78 and a Mosaic spread value of 0.21, indicating the pore walls being a practically perfect graphene single crystal with a good degree of preferred orientation (if prepared under a compression force).

The "mosaic spread" value is obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Some of our graphene foams have a mosaic spread value in this range of 0.3-0.6 when produced using a final heat treatment temperature no less than 2,500° C.

The following are a summary of some of the more significant results:
1) In general, the addition of impacting balls helps to accelerate the process of peeling off graphene sheets from graphite particles. However, this option necessitates the separation of these impacting balls after graphene-coated polymer particles are made.
2) When no impacting balls (e.g. ceramic, glass, metal balls, etc.) are used, harder polymer particles (e.g. PE, PP, nylon, ABS, polystyrene, high impact polystyrene, etc. and their filler-reinforced versions) are more capable of peeling off graphene sheets from graphite particles, as compared to softer polymer particles (e.g. rubber, PVC, polyvinyl alcohol, latex particles).
3) Without externally added impacting balls, softer polymer particles tend to result in graphene-coated or embedded particles having 0.001% to 5% by weight of graphene (mostly single-layer graphene sheets) and harder polymer balls tend to lead to graphene-coated particles having 0.01% to 30% by weight of graphene (mostly single-layer and few layer graphene sheets), given the same 1 hour of operating time.
4) With externally added impacting balls, all polymer balls are capable of supporting from 0.001% to approximately 80% by weight of graphene sheets (mostly few-layer graphene, <10 layers, if over 30% by weight of graphene sheets).
5) The presently invented graphene-carbon hybrid foam materials typically exhibit significantly higher structural integrity (e.g. compression strength, elasticity, and resiliency) and higher thermal conductivities as compared to their counterparts produced by the conventional, prior art methods.
6) It is of significance to point out that all the prior art processes for producing graphite foams or graphene foams appear to provide macro-porous foams having a physical density only in the range of approximately 0.2-0.6 g/cm$^3$, with pore sizes being typically too large (e.g. from 20 to 300 μm) for most of the intended applications. In contrast, the instant invention provides processes that generate graphene foams having a density that can be as low as 0.001 g/cm$^3$ and as high as 1.7 g/cm$^3$. The pore sizes can be varied from microscopic (<2 nm), through meso-scaled (2-50 nm), and up to macro-scaled (e.g. from 1 to 500 μm). This level of flexibility and versatility in designing various types of graphene foams is unprecedented and un-matched by any prior art process.
7) The presently invented method also allows for convenient and flexible control over the chemical composition (e.g. F, O, and N contents, etc.), responsive to various application needs (e.g. oil recovery from oil-contaminated water, separation of an organic solvent from water or other solvents, heat dissipation, etc.).

Example 11: Preparation of MnO$_2$—Graphene Redox Pairs in a Graphene-Carbon Hybrid Foam The MnO$_2$ powder was synthesized by two methods (one with the presence of pristine graphene and the other within the pores of graphene-carbon foam). In one method, a 0.1 mol/L KMnO$_4$ aqueous solution was prepared by dissolving potassium permanganate in deionized water. Meanwhile 13.3 g surfactant of high purity sodium bis(2-ethylhexyl) sulfosuccinate was added in 300 mL iso-octane (oil) and stirred well to obtain an optically transparent solution. Then, 32.4 mL of 0.1 mol/L KMnO$_4$ solution were added in the solution, and a piece of graphene-carbon hybrid foam was immersed in the solution. On a separate basis, pristine graphene sheets were added into the solution. The two pots of resulting suspensions were ultrasonicated for 30 min and a dark brown precipitate of MnO$_2$ was coated on surfaces of the foam walls and graphene sheets, respectively. The products were recovered, washed several times with distilled water and ethanol, and dried at 80° C. for 12 h. The samples were (1) a graphene-carbon hybrid foam structure having graphene wall-supported $MnO_2$ and (2) $MnO_2$-coated graphene sheets, which were then packed into a porous paper-like structure using the vacuum-assisted filtration method. In both cases, graphene and $MnO_2$ form a redox pair operating to produce pseudo-capacitance when a liquid electrolyte is impregnated into pores of the foam. With comparable electrode thickness (approximately 105 µm), the graphene-carbon hybrid foam-based electrode exhibits a significantly lower equivalent series resistance.

Example 12: Evaluation of Various Supercapacitor Cells

In most of the examples investigated, both the inventive supercapacitor cells and their conventional counterparts were fabricated and evaluated. The latter cells, for comparison purposes, were prepared by the conventional procedures of slurry coating of electrodes, drying of electrodes, assembling of anode layer, separator, and cathode layer, packaging of assembled laminate, and injection of liquid electrolyte. In a conventional cell, an electrode (cathode or anode), is typically composed of 85% an electrode active material (e.g. graphene, activated carbon, inorganic nano discs, etc.), 5% Super-P (acetylene black-based conductive additive), and 10% PTFE, which were mixed and coated on Al foil. The thickness of electrode is around 100 µm. For each sample, both coin-size and pouch cells were assembled in a glove box. The capacity was measured with galvanostatic experiments using an Arbin SCTS electrochemical testing instrument. Cyclic voltammetry (CV) and electrochemical impedance spectroscopy (EIS) were conducted on an electrochemical workstation (CHI 660 System, USA).

Galvanostatic charge/discharge tests were conducted on the samples to evaluate the electrochemical performance. For the galvanostatic tests, the specific capacity (q) is calculated as $$q = I*t/m \quad (1)$$

where I is the constant current in mA, t is the time in hours, and m is the cathode active material mass in grams. With voltage V, the specific energy (E) is calculated as, $$E = \int V dq \quad (2)$$

The specific power (P) can be calculated as $$P = (E/t)(W/kg) \quad (3)$$

where t is the total charge or discharge step time in hours. The specific capacitance (C) of the cell is represented by the slope at each point of the voltage vs. specific capacity plot, $$C = dq/dV \quad (4)$$

For each sample, several current density (representing charge/discharge rates) were imposed to determine the electrochemical responses, allowing for calculations of energy density and power density values required of the construction of a Ragone plot (power density vs. energy density).

Figure 7:
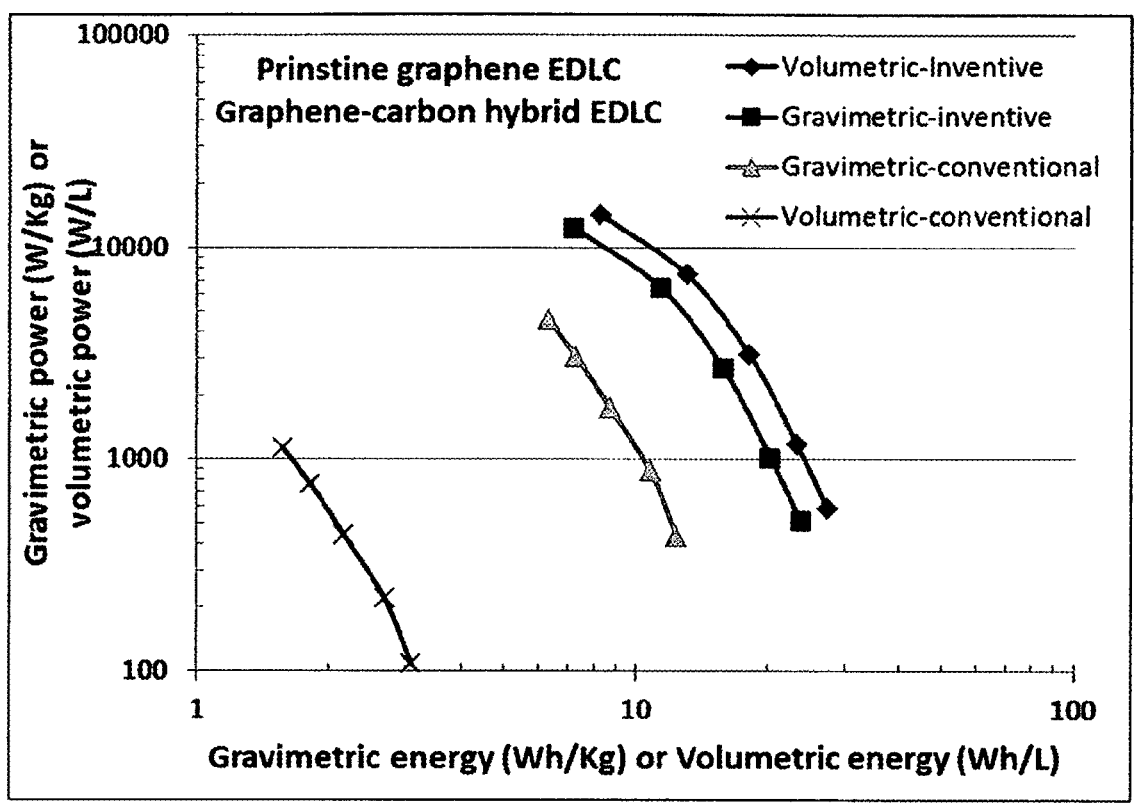
FIG. 7 Ragone plots (gravimetric and volumetric power density vs. energy density) of symmetric supercapacitor (EDLC) cells containing isolated nitrogen-doped graphene sheets or graphene-carbon hybrid foam as the electrode active material and EMIMBF4 ionic liquid electrolyte. Supercapacitors were prepared according to an embodiment of instant invention and, for comparison, by the conventional slurry coating of electrodes.

Shown in FIG. 7 are Ragone plots (gravimetric and volumetric power density vs. energy density) of two sets of symmetric supercapacitor (EDLC) cells containing nitrogen-doped graphene sheets and nitrogen-doped graphene-carbon hybrid as the electrode active material and EMIMBF4 ionic liquid as the electrolyte. One of the two series of supercapacitors was based on the graphene-carbon hybrid foam prepared according to an embodiment of instant invention and the other was by the conventional slurry coating of electrodes. Several significant observations can be made from these data:

(A) Both the gravimetric and volumetric energy densities and power densities of the supercapacitor cells prepared by the presently invented method (denoted as "inventive" in the figure legend) are significantly higher than those of their counterparts prepared via the conventional method (denoted as "conventional"). The differences are highly dramatic and are mainly due to the high active material mass loading (>20 mg/cm$^2$) associated with the presently invented cells, reduced proportion of overhead components (non-active) relative to the active material weight/volume, no binder resin, the ability of the inventive method to more effectively pack graphene sheets into pores of the foam without graphene sheet re-stacking.

(B) For the cells prepared by the conventional method, the absolute magnitudes of the volumetric energy densities and volumetric power densities are significantly lower than those of their gravimetric energy densities and gravimetric power densities, due to the very low tap density (packing density of 0.25 g/cm$^3$) of isolated graphene sheet-based electrodes prepared by the conventional slurry coating method.

(C) In contrast, for the cells prepared by the presently invented method, the absolute magnitudes of the volumetric energy densities and volumetric power densities are higher than those of their gravimetric energy densities and gravimetric power densities, due to the relatively high tap density (packing density of 1.15 g/cm$^3$) of hybrid foam-based electrodes prepared by the presently invented method.

Figure 8:
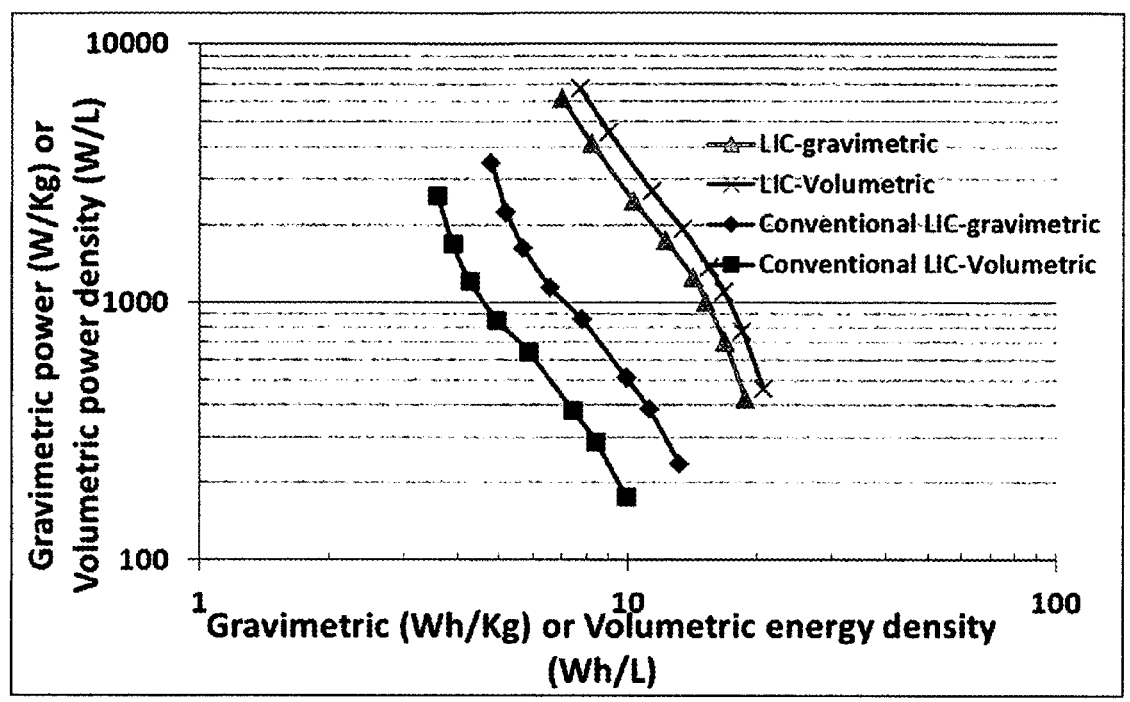
FIG. 8 Ragone plots (gravimetric and volumetric power density vs. energy density) of lithium ion capacitor (LIC) cells containing pristine graphene sheets as the electrode active material and lithium salt-PC/DEC organic liquid electrolyte. Supercapacitors were prepared according to an embodiment of instant invention and by the conventional slurry coating of electrodes.

Shown in FIG. 8 are Ragone plots of lithium ion capacitor (LIC) cells containing pristine graphene sheets as the cathode active material, prelithiated graphite particles as the anode active material, and lithium salt (LiPF$_6$)—PC/DEC as organic liquid electrolyte. The data are for both LICs, wherein the cathode is prepared by the presently invented method and those by the conventional slurry coating of electrodes. These data indicate that both the gravimetric and volumetric energy densities and power densities of the LIC cells prepared by the presently invented method are significantly higher than those of their counterparts prepared via the conventional method. Again, the differences are huge and are mainly ascribed to the high active material mass loading (>25 mg/cm$^2$ at the cathode side) associated with the presently invented cells, reduced proportion of overhead (non-active) components relative to the active material weight/volume, no binder resin, the ability of the inventive method to more effectively pack graphene sheets into pores of the hybrid foam.

For the LIC cells prepared by the conventional method, the absolute magnitudes of the volumetric energy densities and volumetric power densities are significantly lower than those of their gravimetric energy densities and gravimetric power densities, due to the very low tap density (packing density of 0.25 g/cm$^3$) of pristine graphene-based cathodes prepared by the conventional slurry coating method. In contrast, for the LIC cells prepared by the instant method, the absolute magnitudes of the volumetric energy densities and volumetric power densities are higher than those of their gravimetric energy densities and gravimetric power densities, due to the relatively high tap density of pristine graphene-based cathodes prepared by the presently invented method.

It is of significance to point out that reporting the energy and power densities per weight of active material alone on a Ragone plot, as did by many researchers, may not give a realistic picture of the performance of the assembled supercapacitor cell. The weights of other device components also must be taken into account. These overhead components, including current collectors, electrolyte, separator, binder, connectors, and packaging, are non-active materials and do not contribute to the charge storage amounts. They only add weights and volumes to the device. Hence, it is desirable to reduce the relative proportion of overhead component weights and increase the active material proportion. However, it has not been possible to achieve this objective using conventional supercapacitor production processes. The present invention overcomes this long-standing, most serious problem in the art of supercapacitors.

In a commercial supercapacitor having an electrode thickness of 150-200 μm, the weight of the active material (i.e. activated carbon) accounts for about 25%-30% of the total mass of the packaged cell. Hence, a factor of 3 to 4 is frequently used to extrapolate the energy or power densities of the device (cell) from the properties based on the active material weight alone. In most of the scientific papers, the properties reported are typically based on the active material weight alone and the electrodes are typically very thin (<<100 μm, and mostly <<0.50 μm). The active material weight is typically from 5% to 10% of the total device weight, which implies that the actual cell (device) energy or power densities may be obtained by dividing the corresponding active material weight-based values by a factor of 10 to 20. After this factor is taken into account, the properties reported in these papers do not really look any better than those of commercial supercapacitors. Thus, one must be very careful when it comes to read and interpret the performance data of supercapacitors reported in the scientific papers and patent applications.

Example 14: Achievable Electrode Thickness and its Effect on Electrochemical Performance of Supercapacitor Cells One might be tempted to think the electrode thickness of a supercapacitor is a design parameter that can be freely adjusted for optimization of device performance; but, in reality, the supercapacitor thickness is manufacturing-limited and one cannot produce electrodes of good structural integrity that exceed certain thickness level. Our studies further indicate that this problem is even more severe with graphene-based electrode. The instant invention solves this critically important issue associated with supercapacitors.

Figure 9:
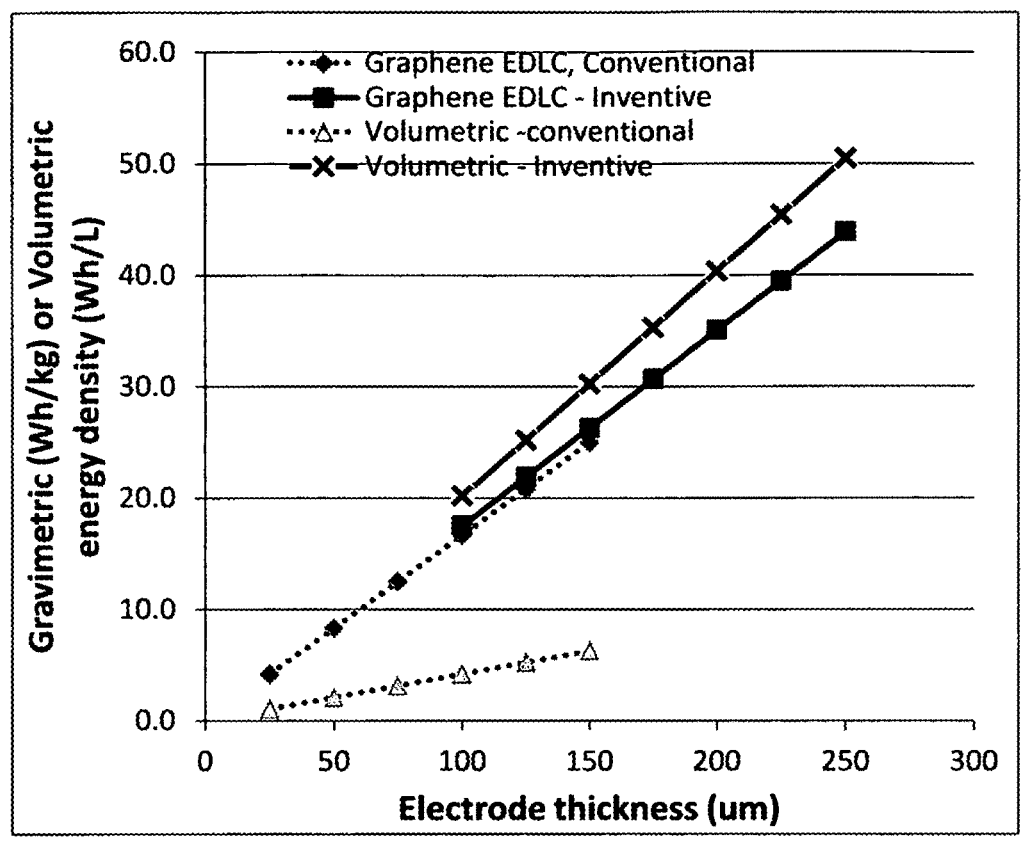
FIG. 9 The cell-level gravimetric and volumetric energy densities plotted over the achievable electrode thickness range of the RGO-based EDLC supercapacitors (organic liquid electrolyte) prepared via the conventional method and the presently invented method. Legends: the gravimetric (♦) and volumetric (▲) energy density of the conventional supercapaitors (highest achieved electrode tap density of approximately 0.25 g/cm$^3$) and the gravimetric (■) and volumetric (x) energy density of the inventive supercapaitors (easily achieved electrode tap density of approximately 0.75 g/cm$^3$).

Also highly significant and unexpected are the data summarized in FIG. 9 for reduced graphene oxide-based EDLC supercapacitors. The cell-level gravimetric and volumetric energy densities plotted over the achievable electrode thickness range of the RGO-based EDLC supercapacitors (organic liquid electrolyte) prepared via the conventional method and those by the presently invented method (oxidized graphene-carbon hybrid foam). In this figure, the gravimetric (♦) and volumetric (▲) energy density of the conventional supercapaitors are based on the highest achieved electrode tap density of approximately 0.25 g/cm$^3$, and the gravimetric (■) and volumetric (x) energy density of the presently invented supercapaitors are from those having an electrode tap density of approximately 0.75 g/cm$^3$, by no means the highest. No one else has previously reported such a high tap density for un-treated, non-activated oxidized graphene electrodes.

These data indicate that the highest gravimetric energy density achieved with RGO-based EDLC supercapacitor cells produced by the conventional slurry coating method is approximately 12 Wh/kg, but those prepared by the presently invented method exhibit a gravimetric energy density as high as 31.6 Wh/kg at room temperature. This is an unprecedentedly high energy density value for EDLC supercapacitors (based on the total cell weight, not the electrode weight or active material weight alone). Even more impressive is the observation that the volumetric energy density of the presently invented supercapacitor cell is as high as 23.7 Wh/L, which is more than 7 times greater than the 3.0 Wh/L achieved by the conventional counterparts.

Example 15: Achievable Active Material Weight Percentage in a Cell and its Effect on Electrochemical Performance of Supercapacitor Cells Because the active material weight accounts for up to about 30% of the total mass of the packaged commercial supercapacitors, a factor of 30% must be used to extrapolate the energy or power densities of the device from the performance data of the active material alone. Thus, the energy density of 20 Wh/kg of activated carbon (i.e. based on the active material weight alone) will translate to about 6 Wh/kg of the packaged cell. However, this extrapolation is only valid for electrodes with thicknesses and densities similar to those of commercial electrodes (150 μm or about 10 mg/cm$^2$ of the carbon electrode). An electrode of the same active material that is thinner or lighter will mean an even lower energy or power density based on the cell weight. Thus, it would be desirable to produce a supercapacitor cell having a high active material proportion. Unfortunately, it has not been previously possible to achieve an active material proportion greater than 30% by weight for activated carbon-based supercapacitors or greater than 15% by weight for graphene-based supercapacitors.

Figure 10:
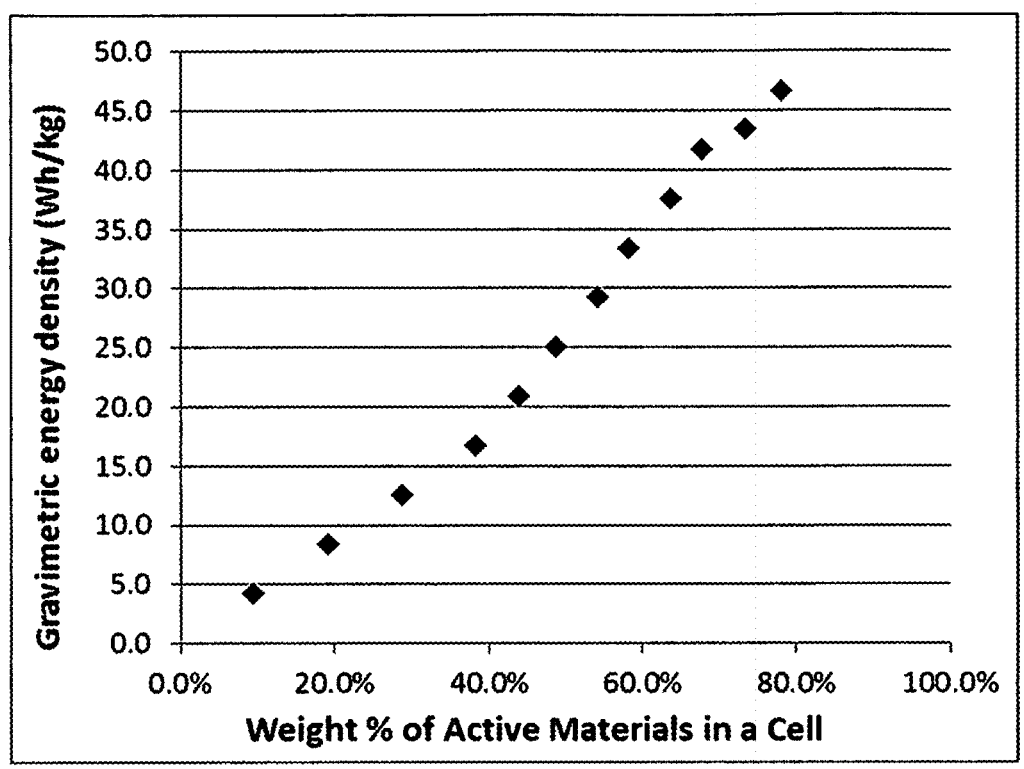
FIG. 10 The cell-level gravimetric energy densities plotted over the achievable active material proportion (active material weight/total cell weight) in a supercapacitor cell for two series of pristine graphene-based EDLC supercapacitors (all with organic liquid electrolyte).

The presently invented method enables the supercapacitors to go well beyond these limits for all active materials investigated. As a matter of fact, the instant invention makes it possible to elevate the active material proportion above 90% if so desired; but typically from 15% to 85%, more typically from 30% to 80%, even more typically from 40% to 75%, and most typically from 50% to 70%. For instance, FIG. 10 shows the cell-level gravimetric energy densities plotted over the achievable active material proportion (active material weight/total cell weight) in a graphene-carbon hybrid foam-based EDLC supercapacitor (with organic liquid electrolyte). An exceptional cell-level energy density of 46.6 Wh/kg has been achieved.

In conclusion, we have successfully developed an absolutely new, novel, unexpected, and patently distinct class of highly conducting graphene-carbon hybrid foam materials, devices, and related processes of production. The chemical composition (% of oxygen, fluorine, and other non-carbon elements), structure (crystal perfection, grain size, defect population, etc.), crystal orientation, morphology, process of production, and properties of this new class of foam materials are fundamentally different and patently distinct from meso-phase pitch-derived graphite foam, CVD graphene-derived foam, pristine graphene-based foamed structure, and graphene foams from hydrothermal reduction of GO.

We claim:

1. A supercapacitor having an anode, a cathode, a porous separator electronically separating said anode and said cathode, and/or an electrolyte in ionic contact with said anode and said cathode, wherein at least one of said anode and said cathode contains an integral 3D graphene-carbon hybrid foam as an electrode active material that forms electric double layers of charges or redox pairs, wherein said hybrid foam is composed of multiple pores and pore walls, wherein said pore walls contain single-layer or few-layer graphene sheets chemically bonded by a carbon material having a carbon material-to-graphene weight ratio from 1/200 to 1/2, wherein said few-layer graphene sheets have 2-10 layers of stacked graphene planes having an inter-plane spacing $d_{002}$ from 0.3354 nm to 0.40 nm as measured by X-ray diffraction and said single-layer or few-layer graphene sheets contain a non-pristine graphene material having 0.001% to 25% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof, and said pore walls contain a non-pristine graphene material and wherein said foam contains a content of non-carbon elements in the range of 0.01% to 20% by weight and said non-carbon elements include an element selected from oxygen, fluorine, chlorine, bromine, iodine, nitrogen, hydrogen, or boron.

2. The supercapacitor of claim 1, further comprising an anode current collector in contact with said anode, and/or a cathode current collector in contact with said cathode.

3. The supercapacitor of claim 1, wherein both said anode and said cathode contain the integral 3D graphene-carbon hybrid foam as an electrode active material.

4. The supercapacitor of claim 1, wherein said 3D graphene foam has a density from 0.005 to 1.7 g/cm$^3$, a specific surface area from 50 to 3,200 m$^2$/g, a thermal conductivity of at least 200 W/mK per unit of specific gravity, and/or an electrical conductivity no less than 2,000 S/cm per unit of specific gravity.

5. The supercapacitor of claim 1, wherein said pore walls contain a pristine graphene and said 3D graphene-carbon hybrid foam has a density from 0.1 to 1.7 g/cm$^3$, an average pore size from 2 nm to 50 nm, and a specific surface area from 300 m$^2$/g to 3,200 m$^2$/g.

6. The supercapacitor of claim 1, which is in a continuous-length filament, wire, or sheet form having a thickness or diameter from 200 nm to 10 cm.

7. The supercapacitor of claim 1, wherein said foam has an oxygen content or non-carbon content less than 1% by weight, and said pore walls have an inter-graphene spacing less than 0.35 nm, a thermal conductivity of at least 250 W/mK per unit of specific gravity, and/or an electrical conductivity no less than 2,500 S/cm per unit of specific gravity.

8. The supercapacitor of claim 1, wherein said foam has an oxygen content or non-carbon content less than 0.01% by weight and said pore walls contain stacked graphene planes having an inter-graphene spacing less than 0.34 nm, a thermal conductivity of at least 300 W/mK per unit of specific gravity, and/or an electrical conductivity no less than 3,000 S/cm per unit of specific gravity.

9. The supercapacitor of claim 1, wherein said foam has an oxygen content or non-carbon content no greater than 0.01% by weight and said pore walls contain stacked graphene planes having an inter-graphene spacing less than 0.336 nm, a thermal conductivity of at least 350 W/mK per unit of specific gravity, and/or an electrical conductivity no less than 3,500 S/cm per unit of specific gravity.

10. The supercapacitor of claim 1, wherein said foam has pore walls containing stacked graphene planes having an inter-graphene spacing less than 0.336 nm, a thermal conductivity greater than 400 W/mK per unit of specific gravity, and/or an electrical conductivity greater than 4,000 S/cm per unit of specific gravity.

11. The supercapacitor of claim 1, wherein the pore walls contain stacked graphene planes having an inter-graphene spacing less than 0.337 nm and a mosaic spread value less than 1.0.

12. The supercapacitor of claim 1, wherein said pore walls contain a 3D network of interconnected graphene planes.

13. The supercapacitor of claim 1, wherein said foam has a physical density higher than 0.8 g/cm$^3$ and a specific surface area greater than 800 m$^2$/g.

14. The supercapacitor of claim 1, wherein said foam has a physical density higher than 1.0 g/cm$^3$ and a specific surface area greater than 500 m$^2$/g.

15. The supercapacitor of claim 1, wherein said anode active material or cathode active material further contains a redox pair partner material selected from a metal oxide, a conducting polymer, a non-conducting polymer, an organic material, an inorganic material, or a combination thereof, wherein said partner material is combined with said graphene sheets or carbon material in said hybrid foam to form redox pairs for pseudo-capacitance.

16. The supercapacitor of claim 15, wherein said metal oxide is selected from $RuO_2$, $IrO_2$, NiO, $MnO_2$, $VO_2$, $V_2O_5$, $V_3O_8$, $TiO_2$, $Cr_2O_3$, $Co_2O_3$, $Co_3O_4$, $PbO_2$, $Ag_2O$, or a combination thereof.

17. The supercapacitor of claim 1, wherein said integral 3D graphene-carbon hybrid foam is chemically or physically activated.

18. A supercapacitor having an anode, a cathode, a porous separator electronically separating said anode and said cathode, and/or an electrolyte in ionic contact with said anode and said cathode, wherein at least one of said anode and said cathode contains an integral 3D graphene-carbon hybrid foam as an electrode active material that forms electric double layers of charges or redox pairs, wherein said hybrid foam is composed of multiple pores and pore walls, wherein said pore walls contain single-layer or few-layer graphene sheets chemically bonded by a carbon material having a carbon material-to-graphene weight ratio from 1/200 to 1/2, wherein said few-layer graphene sheets have 2-10 layers of stacked graphene planes having an inter-plane spacing $d_{002}$ from 0.3354 nm to 0.40 nm as measured by X-ray diffraction and said single-layer or few-layer graphene sheets contain a pristine graphene material having essentially zero % of non-carbon elements, or a non-pristine graphene material having 0.001% to 25% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof, wherein said hybrid foam constitutes an electrode active material loading greater than 10 mg/cm$^2$, and/or wherein said hybrid foam constitutes an electrode layer having a thickness no less than 200 μm, and/or said anode active material and said cathode active material combined exceeds 30% by weight of said supercapacitor cell.

19. The supercapacitor of claim 18, wherein said hybrid foam constitutes an electrode active material loading greater than 15 mg/cm$^2$, and/or wherein said hybrid foam constitutes an electrode layer having a thickness no less than 300 μm, and/or said anode active material and said cathode active material combined exceeds 40% by weight of said supercapacitor cell.

20. The supercapacitor of claim 18, wherein said hybrid foam constitutes an electrode active material loading greater than 20 mg/cm$^2$ and/or wherein said hybrid foam constitutes an electrode layer having a thickness no less than 400 μm, and/or said anode active material and said cathode active material combined exceeds 50% by weight of said supercapacitor cell.

21. The supercapacitor of claim 18, wherein said hybrid foam constitutes an electrode active material loading greater than 30 mg/cm$^2$ and/or wherein said hybrid foam constitutes an electrode layer having a thickness no less than 500 μm, and/or said anode active material and said cathode active material combined exceeds 60% by weight of said supercapacitor cell.

22. A supercapacitor electrode containing an integral 3D graphene-carbon hybrid foam as an electrode active material that forms electric double layers of charges or redox pairs in a supercapacitor, wherein said hybrid foam is composed of multiple pores and pore walls, wherein said pore walls contain single-layer or few-layer graphene sheets chemically bonded by a carbon material having a carbon material-to-graphene weight ratio from 1/200 to 1/2, wherein said few-layer graphene sheets have 2-10 layers of stacked graphene planes having an inter-plane spacing $d_{002}$ from 0.3354 nm to 0.40 nm as measured by X-ray diffraction and said single-layer or few-layer graphene sheets contain a non-pristine graphene material having 0.001% to 25% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof, and said pore walls contain a non-pristine graphene material and wherein said foam contains a content of non-carbon elements in the range of 0.01% to 20% by weight and said non-carbon elements include an element selected from oxygen, fluorine, chlorine, bromine, iodine, nitrogen, hydrogen, or boron.

23. A supercapacitor having an anode, a cathode comprising the electrode of claim 22, a porous separator electronically separating said anode and said cathode, and/or an electrolyte in ionic contact with said anode and said cathode, wherein said anode contains a pre-lithiated anode active material and said supercapacitor is a lithium-ion capacitor.

24. A process for producing the supercapacitor electrode of claim 22, said process comprising:
(a) mixing multiple particles of a graphitic material and multiple particles of a solid polymer carrier material to form a mixture in an impacting chamber of an energy impacting apparatus;
(b) operating said energy impacting apparatus with a frequency and an intensity for a length of time sufficient for peeling off graphene sheets from said graphitic material and transferring said graphene sheets to surfaces of said solid polymer carrier material particles to produce graphene-coated or graphene-embedded polymer particles inside said impacting chamber;
(c) recovering said graphene-coated or graphene-embedded polymer particles from said impacting chamber;
(d) consolidating said graphene-coated or graphene-embedded polymer particles into a sheet or film of graphene-polymer composite structure; and
(e) pyrolyzing said sheet or film of graphene-polymer composite structure to thermally convert said polymer into pores and carbon or graphite that bonds said graphene sheets to form a sheet or film of said integral 3D graphene-carbon hybrid foam.

25. The process of claim 24, wherein said step (d) of consolidating said graphene-coated or graphene-embedded polymer particles is conducted in a roll-to-roll manner to form a roll of graphene-polymer composite structure sheet or film, which is pyrolyzed to form a sheet or film of said integral 3D graphene-carbon hybrid foam.

26. The process of claim 24, wherein said step (e) of pyrolyzation is followed by a step of chemically or physically activating the integral 3D graphene-carbon hybrid foam.

27. A process for producing a continuous sheet of a supercapacitor, said process comprising the steps of laminating an anode layer, a separator/electrolyte layer, and a cathode layer, wherein at least said anode layer or said cathode layer contains a continuous sheet or film of the integral 3D graphene-carbon hybrid foam produced by the process of claim 24.

* * * * *